(12) United States Patent
Rotter

(10) Patent No.: US 10,385,583 B2
(45) Date of Patent: Aug. 20, 2019

(54) SHEAR TRANSFER SYSTEM

(71) Applicant: Martin J. Rotter, Glenside, PA (US)

(72) Inventor: Martin J. Rotter, Glenside, PA (US)

( * ) Notice: Subject to any disclaimer, the term of this patent is extended or adjusted under 35 U.S.C. 154(b) by 0 days.

(21) Appl. No.: 15/465,136

(22) Filed: Mar. 21, 2017

(65) Prior Publication Data
US 2017/0268223 A1 Sep. 21, 2017

Related U.S. Application Data

(60) Provisional application No. 62/311,115, filed on Mar. 21, 2016.

(51) Int. Cl.
| | | |
|---|---|---|
| *E04H 9/02* | (2006.01) | |
| *E04B 7/02* | (2006.01) | |
| *E04B 7/06* | (2006.01) | |
| *E04B 5/12* | (2006.01) | |
| *E04H 9/14* | (2006.01) | |
| *E04C 3/17* | (2006.01) | |
| *E04B 7/18* | (2006.01) | |
| *E04B 1/26* | (2006.01) | |

(52) U.S. Cl.
CPC ............. *E04H 9/021* (2013.01); *E04B 5/12* (2013.01); *E04B 7/022* (2013.01); *E04B 7/06* (2013.01); *E04C 3/17* (2013.01); *E04H 9/14* (2013.01); *E04B 7/18* (2013.01); *E04B 2001/2696* (2013.01); *Y02A 50/14* (2018.01)

(58) Field of Classification Search
CPC ..... E04B 1/98; E04B 2/56; E04B 5/02; E04B 7/06; E04B 7/18; E04B 7/022; E04H 9/021

USPC .......................................................... 52/90.1
See application file for complete search history.

(56) References Cited

U.S. PATENT DOCUMENTS

| | | | | |
|---|---|---|---|---|
| 644,176 A | * | 2/1900 | Johnston | ............... E04B 1/2608 52/344 |
| 1,146,251 A | * | 7/1915 | Harp | ..................... E04B 1/2608 52/289 |
| 1,204,959 A | | 11/1916 | Day | |

(Continued)

FOREIGN PATENT DOCUMENTS

| | | |
|---|---|---|
| AU | 2007231770 A1 | 5/2008 |
| CH | 686686 A5 | 5/1996 |

(Continued)

OTHER PUBLICATIONS

"Design Solutions for Wood-Frame Multi-Story Buildings—Resisting Uplift and Lateral Forces" Simpson Strong-Tie [online]. Aug. 2007 Retrieved on Nov. 17, 2015. Retrieved from the internet: <http://www.strongtie.com/ftp/articles/woodframemultistory-article.pdf>; figure 3; p. 6.

(Continued)

*Primary Examiner* — Joshua J Michener
*Assistant Examiner* — James J Buckle, Jr.
(74) *Attorney, Agent, or Firm* — Volpe and Koenig, P.C.

(57) ABSTRACT

A shear transfer system is provided. In the system, a shear tie strap is attached to a first framing member, a second framing member, a third framing member, a fourth framing member, and a fifth framing member of a frame in a framed building. The second, third, fourth, and fifth framing members are orthogonal or oblique to the first framing member. More than one shear tie strap may be present in the framed building.

21 Claims, 14 Drawing Sheets

(56) References Cited

U.S. PATENT DOCUMENTS

| | | | |
|---|---|---|---|
| 1,656,741 A | | 1/1928 | Lane |
| 1,725,414 A | * | 8/1929 | Parish ............... E04C 3/02 52/695 |
| 1,729,741 A | * | 10/1929 | Heltzel ............... E04C 3/02 52/695 |
| 2,455,904 A | * | 12/1948 | Meulenbergh ....... E04C 3/02 52/695 |
| 2,914,816 A | * | 12/1959 | Lundgren ............ E04C 3/02 403/167 |
| 3,108,406 A | * | 10/1963 | Ellis .................... E04B 5/32 29/897.32 |
| 3,303,773 A | | 2/1967 | Smith et al. |
| 3,333,875 A | | 8/1967 | Tracy |
| 3,423,898 A | | 1/1969 | Tracy et al. |
| 3,481,635 A | | 12/1969 | Tracy |
| 4,122,647 A | * | 10/1978 | Kovar .................. E04C 3/02 52/695 |
| 4,498,801 A | | 2/1985 | Gilb |
| 4,794,746 A | * | 1/1989 | Ramer ................. E04B 5/12 52/695 |
| 4,893,961 A | | 1/1990 | O'Sullivan et al. |
| 5,004,369 A | * | 4/1991 | Young ................. E04B 1/2612 403/232.1 |
| 5,197,241 A | | 3/1993 | Romeo et al. |
| 5,230,190 A | * | 7/1993 | Schuette ............. E04C 3/02 248/57 |
| 5,457,928 A | * | 10/1995 | Sahnazarian ........ E04B 1/2612 403/232.1 |
| 5,568,706 A | | 10/1996 | Gerhing et al. |
| 5,797,694 A | | 8/1998 | Breivik |
| 6,131,359 A | * | 10/2000 | Duff .................... E04B 5/12 52/514 |
| 6,332,299 B1 | | 12/2001 | Stewart, III |
| 6,490,840 B1 | | 12/2002 | Thompson |
| 6,840,020 B2 | | 1/2005 | Leek et al. |
| 6,843,036 B2 | * | 1/2005 | Stewart, III ......... E04B 5/12 137/362 |
| 6,877,291 B2 | | 4/2005 | Shamroukh et al. |
| 6,892,504 B1 | | 5/2005 | diGirolamo et al. |
| 7,134,252 B2 | | 11/2006 | Thompson |
| 7,381,058 B1 | | 6/2008 | Hayes, Sr. |
| 7,503,148 B2 | | 3/2009 | Lin |
| 7,877,961 B2 | * | 2/2011 | Strickland ........... B21D 47/01 52/153 |
| 8,112,968 B1 | * | 2/2012 | Mueller ............... E04H 9/02 52/656.2 |
| 9,200,446 B1 | * | 12/2015 | diGirolamo ......... E04B 5/12 |
| 2002/0020122 A1 | | 2/2002 | Mueller |
| 2004/0107653 A1 | | 6/2004 | Collie |
| 2005/0076607 A1 | | 4/2005 | Fennell, Jr. |
| 2005/0202779 A1 | | 9/2005 | Smith |
| 2006/0254192 A1 | | 11/2006 | Fennell, Jr. |
| 2007/0054612 A1 | | 3/2007 | Ehrman et al. |
| 2008/0318516 A1 | | 12/2008 | Rotter |
| 2010/0162783 A1 | | 7/2010 | Lin |
| 2011/0302852 A1 | | 12/2011 | Grubka et al. |
| 2012/0047828 A1 | | 3/2012 | Bahn |
| 2012/0047841 A1 | | 3/2012 | Fyfe et al. |
| 2014/0179220 A1 | | 6/2014 | Railkar et al. |

FOREIGN PATENT DOCUMENTS

| | | |
|---|---|---|
| CN | 202809942 U | 3/2013 |
| EP | 1 333 131 B1 | 3/2006 |
| EP | 2527547 A2 | 11/2012 |
| GB | 2 186 606 A | 8/1987 |
| GB | 2 376 960 A | 12/2002 |
| JP | 55039571 | 3/1980 |
| JP | H108284323 A | 10/1996 |
| JP | 2000-145026 A | 5/2000 |
| JP | 2003041714 A2 | 2/2003 |
| RU | 2413822 C1 | 3/2011 |
| WO | 2015/143149 A1 | 9/2015 |

OTHER PUBLICATIONS

"Retrofit Information" World Housing Encyclopedia [online]. Jan. 25, 2015. Retrieved on Nov. 18, 2015. Retrieved from the internet: <https://web.archive.org/web/20 150 125130453/http:/ldb.world-housing.netlbuilding/154>; entire document.

Wind Brace Builder Bill Jul. 2, 2013 Source: https://web.archive.org/web/20130702090711/http://www.builderbill-diy-help.com/wind-brace.html Date Accessed: Dec. 21, 2014.

The Shed Roof Begins DIY House Oct. 15, 2011 Source: http://bluemount.terravista.com.au/the-shed-roof-begins Date Accessed: Dec. 18, 2014.

Zinc Plated Bracket/Cross Bars Rands Creative Creations Harold Rand Enterprises Dec. 16, 2010 Source: http://www.rcchre.com/CatPages/ADL/Hardware/H070_1.html Date Accessed: Dec. 21, 2014.

GT2Z/GT6Z/GTFZ Gazebo Connectors Simpson Strong-Tie Nov. 9, 2013 Source: https://web.archive.org/web/20131109034409/http://www.strongtie.com/products/DIY/GT2-GT6-GTF.html Date Accessed: Dec. 21, 2014.

Strap & Ties Simpson String-Tie Dec. 12, 2013 Source: http://www.strongtie.com/ftp/catalogs/c-2013/C-2013-p172-174.pdf.

Bracing systems SteelConstruction.info Nov. 22, 2013 Source: https://web.archive.org/web/20131122211449/http://www.steelconstruction.info/Bracing_systems Date Accessed: Dec. 21, 2014.

\* cited by examiner

SHEAR TRANSFER SYSTEM

CROSS REFERENCE TO RELATED APPLICATION

This application claims priority to U.S. Provisional Patent Application No. 62/311,115, filed Mar. 21, 2016, and is incorporation by reference as if fully set forth.

FIELD

This disclosure is related to the general field of construction systems. In aspects, the disclosure relates to hurricane and earthquake resistant building structures.

BACKGROUND

Framing in construction includes vertical and horizontal members of exterior walls and interior partitions, both of bearing walls and non-bearing walls. These members, referred to as studs or stick members, wall plates (top and bottom) and lintels (headers), serve as a nailing (or other fastener) base for all covering material and support upper floor platforms, which provide lateral strength along a wall. The platforms may be the boxed structure of a ceiling and roof, or the ceiling and floor joists of the story above. The studs give the structure its vertical support, and the box-shaped floor sections with joists contained within length-long post and lintels (more commonly called headers), support the weight of whatever is above, including the next wall up and the roof above the top story. The platform also provides the lateral support against wind and holds the stick walls true and square. A lower platform can support the weight of platforms and walls above the level of its component headers and joists.

Exterior wall studs are the vertical members to which sheathing and cladding are attached. They are supported on a bottom plate or foundation sill and in turn support the top plate. Studs are commonly spaced at 16 inches on center. This spacing may be changed, e.g., to 12 or 24 inches on center, depending on the load and the limitations imposed by the type and thickness of the wall covering used. The studs are attached to horizontal top and bottom wall plates that are often the same width as the studs.

The floors, walls and roof of a building are typically made torsionally stable with the installation of a plywood or composite wood skin referred to as sheathing. Spacing the framing members properly usually allows them to align with the edges of standard sheathing. In the past, tongue and groove planks installed diagonally were used as sheathing. Occasionally, wooden or galvanized steel braces are used instead of sheathing. There are also engineered wood panels made for shear and bracing.

Some types of exterior sheathing, such as asphalt-impregnated fiberboard, plywood, oriented strand board and wafer board, may provide adequate bracing to resist lateral loads and keep the wall square. Construction codes in many jurisdictions require a stiff plywood sheathing. Others, such as rigid glass-fiber, asphalt-coated fiberboard, polystyrene or polyurethane board, will not. In these latter cases, walls have been reinforced with a diagonal wood or metal bracing inset into the studs. In jurisdictions subject to strong wind storms (hurricane countries, tornado alleys) local codes or state law may require both the diagonal wind braces and the stiff exterior sheathing, regardless of the type and kind of outer weather resistant coverings.

A multiple-stud post made up of at least three studs, or the equivalent, is generally used at exterior corners and intersections to secure a good tie between adjoining walls and to provide nailing support for the interior finish and exterior sheathing. Corners and intersections may be framed with at least two studs.

Roofs are usually built to provide a sloping surface intended to shed rain or snow, with slopes ranging from 1 cm of rise per 15 cm (less than an inch per linear foot) of rafter run (horizontal span), to steep slopes of more than 2 cm per cm (two feet per foot) of rafter run. The roof structure can be constructed from rafters and a ridge pole or now more commonly from pre-fabricated trusses that are assembled from stick members and metal connector plates to provide a ridged structure that is capable of extending over long spans without intermediate supports. A light-frame structure built mostly inside sloping walls comprising a roof is called an A-frame.

Light-frame methods allow easy construction of unique roof designs; hip roofs, for example, slope toward walls on all sides and are joined at hip rafters that span from corners to a ridge. Valleys are formed when two sloping roof sections drain toward each other. Dormers are small areas in which vertical walls interrupt a roof line, and which are topped off by slopes at usually right angles to a main roof section. Gables are formed when a length-wise section of sloping roof ends to form a triangular wall section.

Light-frame materials are most often wood or rectangular steel, tubes or C-channels. Wood pieces are typically connected with nails or screws as fasteners. Steel pieces may be connected with nuts and bolts. Preferred species for linear structural members are softwoods such as spruce, pine and fir. Recently, architects have begun experimenting with pre-cut modular aluminum framing to reduce on-site construction costs.

Intersections between portions of a framed building may be subject to shear. It has been known in the field of building construction to attach walls and floors to the building foundation in manner conducive to hold the building structure stable during hurricanes and/or earthquakes. As reflected above, construction systems intended for high wind (e.g., tornado or hurricane) prone or earthquake zones may require sufficient horizontal support from horizontal members, sheathing, and diagonal bracing in order to stabilize the structure. Metal ties may be used to connect frame components to the foundation. But currently there is no system which includes tying members spanning between sections of a building, between members along walls, between members around corners, members between levels, or the like to prevent damage due to shearing.

SUMMARY

In an aspect, the invention relates to a shear transfer system. The shear transfer system comprises a first framing member, a second framing member, a third framing member, a fourth framing member, a fifth framing member, and a shear tie strap. The second framing member, the third framing member, the fourth framing member, and the fifth framing member are connected to the first framing member in a building frame, and are oblique or orthogonal to the first framing member. The second framing member and the third framing member extend away from the first framing member in a first direction. The fourth framing member and the fifth framing member extend away from the first framing member in a second direction. The second framing member is opposed to the fourth framing member, and the third framing member is opposed to the fifth framing member. The shear tie strap comprises two cross straps, a center where the two cross straps intersect or cross, and termini at each end of both cross straps. The center of the shear tie strap is attached to the first framing member. The shear tie strap further comprises a first longitudinal end displaced from the center of the shear tie strap in a first direction toward a first end of the first framing member, and a second longitudinal end displaced from the center of the shear tie strap in a second direction toward a second end of the first framing member and opposite to the first direction. The termini on the first longitudinal end are respectively attached to the second framing member and the fourth framing member, and the termini on the second longitudinal end are respectively attached to the third framing member and the fifth framing member.

In an aspect, the invention relates to a shear transfer system. The shear transfer system comprises a first framing element and a second framing element, a second framing member, a third framing member, a fourth framing member, a fifth framing member, and a shear tie strap. The first framing element is separated from the second framing element by a width. Each of the first framing element and the second framing element comprise a respective length, a respective first end, and a respective second end. Each of the first framing element and the second framing element are integrated in a frame of a framed building. The second framing member and the third framing member extend across the first framing element and toward the second framing element across the width. The fourth framing member and the fifth framing member extend across the second framing element and toward the first framing element across the width. The second framing member is opposed to the fourth framing member in the frame, and the third framing member is opposed to the fifth framing member in the frame. The shear tie strap comprises a first cross strap and a second cross strap that intersects or crosses the first cross strap, a center where the first cross strap and second cross strap intersect or cross, termini at each end of each cross strap. The shear tie strap also comprises a first connecting strap connecting a first one of the termini of the first cross strap to a first one of the termini of the second cross strap, a second connecting strap connecting a second one of the termini of the first cross strap to a second one of the termini of the second cross strap, a third connecting strap connecting the first one of the termini of the first cross strap to the second one of the termini of the second cross strap, and a fourth connecting strap connecting the second one of the termini of the first cross strap with the first one of the termini of the second cross strap. The first connecting strap is attached to the first framing element, the second connecting strap is attached to the second framing element, the third connecting strap is attached to the second framing member and the fourth framing member, and the fourth connecting strap is attached to the third framing member and the fifth framing member.

BRIEF DESCRIPTION OF THE DRAWINGS

The following detailed description of embodiments of the present invention will be better understood when read in conjunction with the appended drawings. For the purpose of illustrating the invention, there are shown in the drawings particular embodiments. It is understood, however, that the invention is not limited to the precise arrangements and instrumentalities shown. In the drawings:

FIG. 11 illustrates a truss roof of a framed building where a shear tie strap is placed in a shear transfer system.

DETAILED DESCRIPTION OF THE PREFERRED EMBODIMENTS

Figure 1:
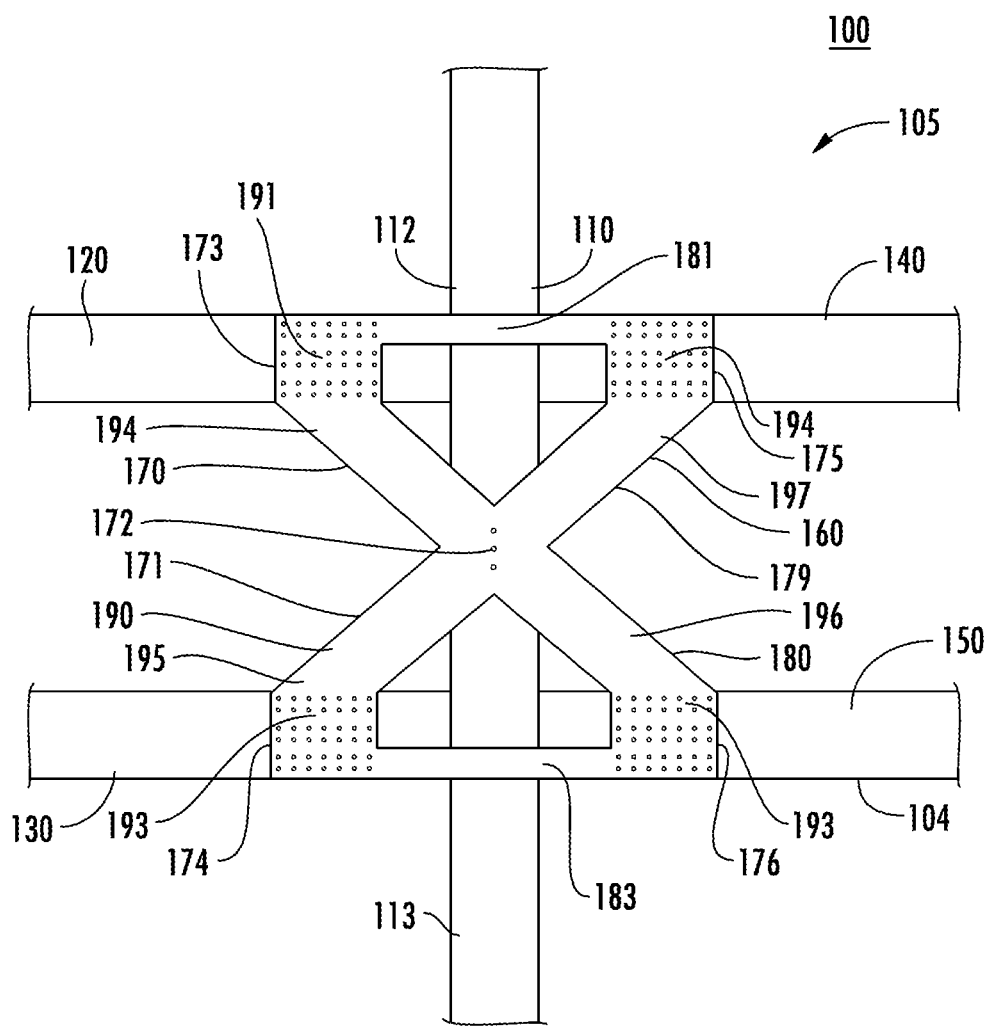
FIG. 1 illustrates a general shear transfer system where a shear tie strap is attached to the framing of a framed building.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

Referring to FIG. 1, a shear transfer system 100 comprising a first framing member 110, a second framing member 120, a third framing member 130, a fourth framing member 140, a fifth framing member 150, and a shear tie strap 160 is shown.

The first framing member may comprise a length, a first end 112, and a second end 113. The first framing member may be integrated in a frame 104 of a framed building 105. Dashed lines at the ends of the first framing member 110 indicate that the framing element in the framed building 105 may continue on in the frame past the point where the shear tie strap is attached. The first framing member may be any element within a framed building.

The second framing member 120, the third framing member 130, the fourth framing member 140, and the fifth framing member 150 may be connected to the first framing member in the framed building, and oblique or orthogonal to the first framing member. Second, third, fourth, and fifth framing members orthogonal to the first framing member may be preferred. As illustrated in FIG. 1, these framing members are arranged orthogonal to the first framing member 110. This arrangement is, however, only one possible arrangement. Where a framed building includes framing members that do not meet at ninety degree angles, these elements may still be part of a shear transfer system herein. Alternatively, one or more of the second, third, fourth, and fifth framing members 110, 120, 130, 140 may be blocking installed between other framing members.

The second framing member and the third framing member extend away from the first framing member in a first direction, leftward in FIG. 1. The fourth framing member and the fifth framing member extend away from the first framing member in a second direction, rightward in FIG. 1. Where one or more of the second, third, fourth, or fifth framing members 110, 120, 130, 140 are oblique, the oblique framing members may still be referred to as extending in either the first direction or the second direction. As illustrated in FIG. 1, the second framing member 120 is positioned 180 degrees relative to the fourth framing member 140, and the third framing member 130 is positioned 180 degrees relative to the fifth framing member 150. However, in embodiments where one or more of the second, third, fourth, or fifth framing members 110, 120, 130, 140 are oblique, the angle between the second framing member and the fourth framing member may vary, and the angle between the third framing member and the fifth framing member may also vary such that a cross strap 160 may be positioned thereon. Whether orthogonal or oblique, this relationship may be described as the second framing member being opposed to the fourth framing member, and the third framing member being opposed to the fifth framing member.

The second framing member 120, the third framing member 130, the fourth framing member 140, and the fifth framing member 150 may also be integrated in the frame 104 of the framed building 105.

The shear tie strap comprises two cross straps. As illustrated in FIG. 1, the shear tie strap has a first cross strap 170, a second cross strap 171, a center 172, where the two cross straps intersect or cross, and termini at each end of both cross strap. The center 172 of the shear tie strap may be attached to the first framing member.

The termini may be referred to as termini one 173, termini two 174, termini three 175, and termini four 176. Termini one 173 may be attached to the second framing member 120, termini two 174 may be attached to the third framing member 130, termini three 175 may be attached to the fourth framing member 140, and termini four 176 may be attached to the fifth framing member 150.

The portion of the shear tie strap spaced apart from the center of the shear tie strap in a first direction toward the first end of the first framing member may be referred to a first longitudinal end 179. Likewise, the portion of the shear tie strap spaced apart from the center of the shear tie strap in a second direction toward a second end of the first framing member, and opposite to the first direction, may be referred to as a second longitudinal end 180. As illustrated in FIG. 1, the termini on the first longitudinal end (termini one 173 and termini three 175) are respectively attached to the second framing member and the fourth framing member, and the termini on the second longitudinal end (termini two 174 and termini four 176) are respectively attached to the third framing member and the fifth framing member. Each section of a shear tie strap radiating from the center may be referred to an arm. For example, the shear tie strap 160, as illustrated in FIG. 1, includes a first arm 194 radiating toward the upper left from the center 172, a second arm 195 radiating to the lower left from the center 172, a third arm 196 radiating toward the lower right from the center 172, and a fourth arm 197 radiating toward the upper right from the center 172. Each arm may have a different angle relative to a midline of the shear tie strap 160 through the center 172 and parallel to the first framing member 110. Each arm may have a different twist relative to the center 172 to conform to the surface of the framed building.

The frame 104 has an exterior side (upward in FIG. 1) and an interior side (downward in FIG. 1) relative to the framed building and a shear tie strap 160 may be on either the exterior or the interior side. As illustrated in FIG. 1, the shear tie strap 160 is attached to the exterior side of the frame 104. For convenience, sheathing is not illustrated in FIG. 1 or FIGS. 2 through 7 and 10 through 11. But the skilled artisan readily understands that framed buildings most often include sheathing and other materials attached to the frame. In an embodiment, sheathing is interposed between the shear tie strap 160 and at least one of the first framing member 120, the second framing member 120, the third framing member 130, the fourth framing member 140, or the fifth framing member 150. In an alternative embodiment, the shear tie strap 160 is between the sheathing and at least one of the first framing member 120, the second framing member 120, the third framing member 130, the fourth framing member 140, or the fifth framing member 150.

A shear tie strap in a shear transfer system may comprise fastener strips comprising fastener engagement areas to attach the shear transfer system to framing members. The fastener strips may be adapted to receive any type of fastener to fix a shear tie strap to framing members. In an embodiment, the fasteners are nails and the fastener strip may be referred to as a nailer strip or nailing strip. The fastener engagement areas may be holes through which nails may be driven. A fastener strip may include one or more fastener engagement areas. A shear transfer system may include at least one fastener that attaches the shear tie strap to framing members. FIG. 1 illustrates the shear tie strap 160 with fastener strips 191, 192, 193, and 194 (dots representing fastener engagement areas) located at the termini 173, 174, 175, and 176, respectively. Shear tie strap 160 is also illustrated with a fastener strip (a dot) at the center 172. A variety of different configurations of fastener strips and numbers of fastener engagement areas may be provided. One variation from the shear tie strap 160 may be to include multiple fastener engagement areas around the center 172.

A shear transfer system may include a shear tie strap comprising at least one connecting strap. As illustrated in FIG. 1, the shear tie strap 160 includes two connecting straps. A first connecting strap 181 extends over the first framing member 111 and connects the cross straps (through connection with termini 173 and 176) on the first longitudinal end 179 of the shear tie strap 160. And a second connecting strap 183 extends over the first framing member 111 and connects the cross straps on the second longitudinal end 180 of the shear tie strap 160. A connecting strap may be at the termini of cross straps, as illustrated, or at an intermediate position between the termini at one end of a shear tie strap and the center. The embodiment illustrated in FIG. 1 includes two connecting straps. But a shear tie strap may have no connecting strap. A shear tie strap may include one connecting strap between any two neighboring termini. A shear tie strap may include three connecting straps, connecting all but one of the neighboring termini. A shear tie strap may also include four connecting straps, connecting all four of the neighboring termini, as discussed in connection with another embodiment of the shear transfer system, below.

As illustrated in FIG. 1, both of the first connecting strap 181 and the second connecting strap 182 are at the respective termini on the first longitudinal end and the second longitudinal end, and comprise one or more fastener strips. A connecting strap may include one or more fastener strips.

A shear tie strap in a shear transfer system may be one integral unit comprising a first cross strap, a second cross strap, and any connecting straps that may be present. A shear tie strap in a shear transfer system may be comprised of separate parts that are fixed to one another. A shear tie strap in a shear transfer system may be comprised of a combination of integral components forming an integral unit and one or more separate parts fixed to the integral unit.

The shear transfer system illustrated in FIG. 1 may be adapted to a wide variety structures in a framed building. The representation in FIG. 1 appears planar, and the shear transfer system may include a planar shear tie strap attached to framing members within the same plane. However, a shear transfer system may include a shear tie strap where each arm is angled to conform to the surface of the framed building upon which it is attached. For example, the shear tie strap 160 may include the first arm 194 and the second arm 195 at a 90 degree angle with respect to the third arm 193 and the fourth arm 194 when the center 172 is positioned at a 90 degree corner of a framed building.

FIGS. 2 through 7 illustrate portions of a framed building where a shear tie strap may be attached in a shear transfer system. However, the locations of the shear tie strap and the framing elements identified as the first framing member, the second framing member, the third framing member, the fourth framing member, and the fifth framing member with reference to FIGS. 2 through 7 are merely exemplary alternatives in which the shear transfer system of FIG. 1 may be configured. Other framing elements and locations on a framed building may be part of a shear transfer system herein. The variations of a shear transfer system described with respect to FIG. 1 may be applied, as appropriate for the example provided, to the configurations described with respect to FIGS. 2 through 7.

Figure 2:
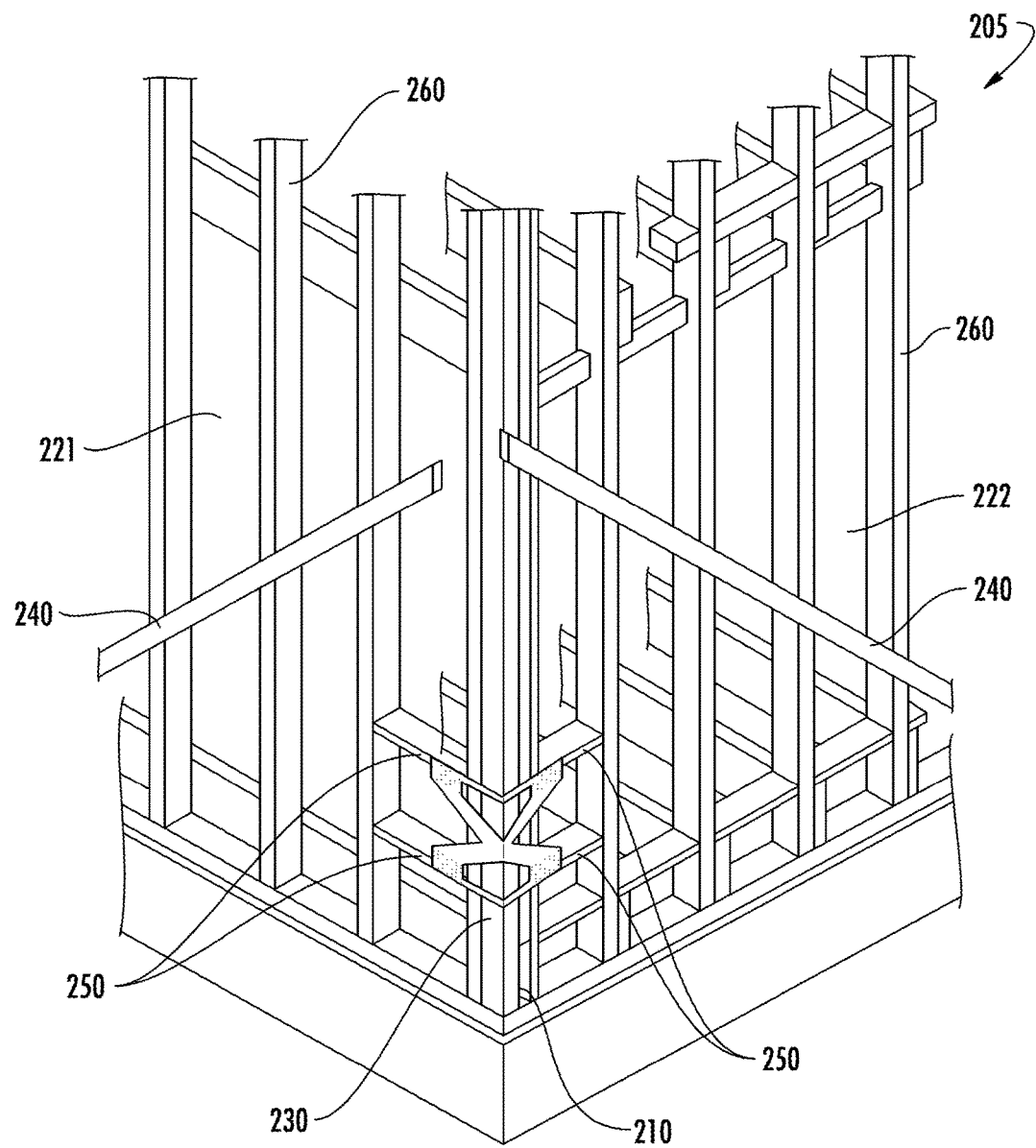
FIG. 2 illustrates a corner of a framed building where a shear tie strap is placed in a shear transfer system.

Referring to FIG. 2, a framed building 205 comprises a corner 210 between adjoining walls, first wall 221 and second wall 222, and a corner post 230 at the corner 210. The first framing member in a shear transfer system herein may be the corner post 230. The framed building comprises bracing 240 or blocking 250 between studs in each adjoining wall, the first wall 221 and the second wall 222, and the corner post 230. The second framing member, the third framing member, the fourth framing member, and the fifth framing member may be respective portions of the bracing 240 or blocking 250.

FIG. 2 illustrates the corner 210 as the intersection between two adjoining walls. However, an intersection of two walls need not be 90 degrees. The two adjoining walls may meet at many different angles, including 180 degrees. The arms of the shear tie strap may be configured to adapt to the angle of the two adjoining walls around the post at an intersection.

Figure 3:
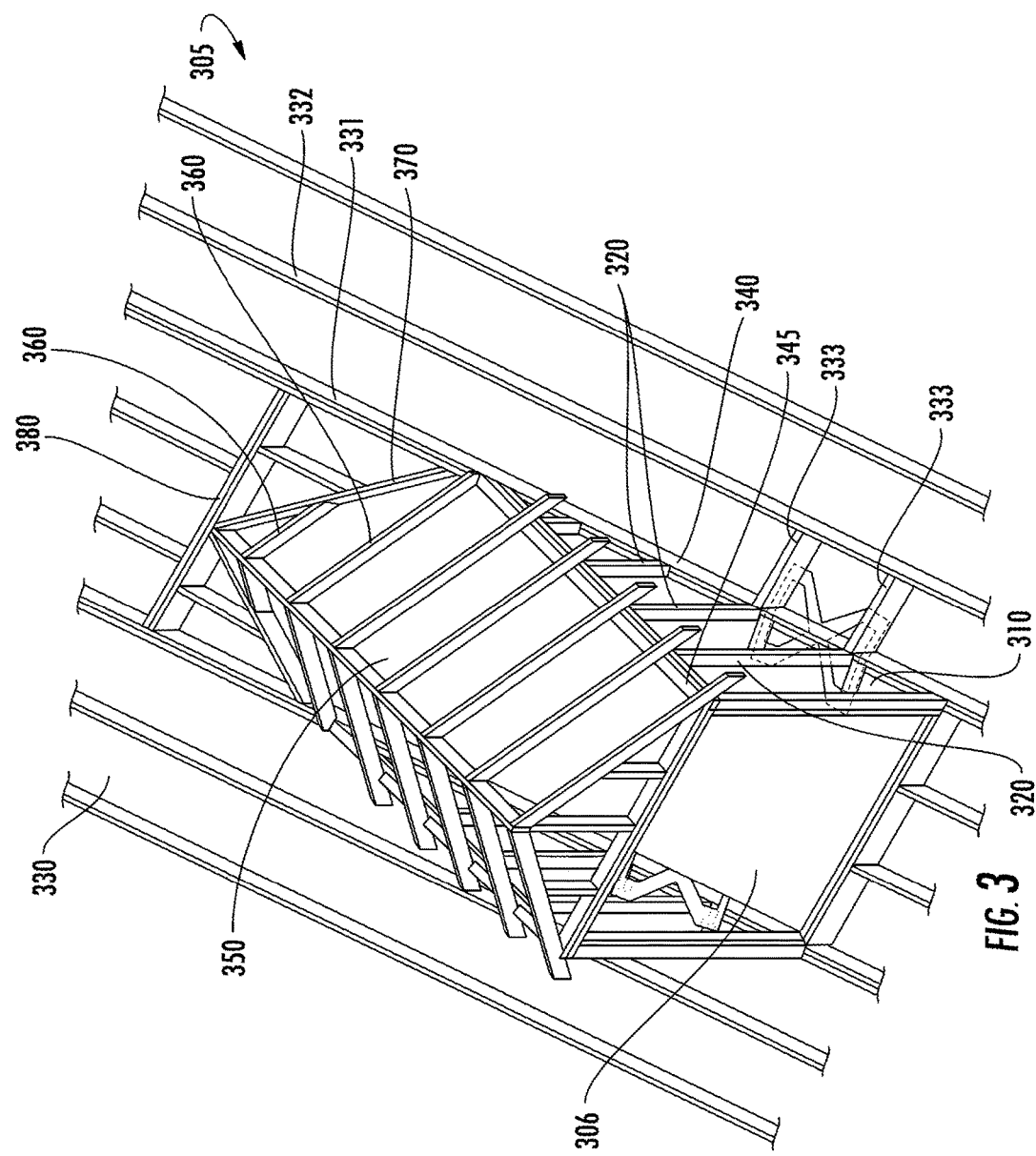
FIG. 3 illustrates a dormer of a framed building where a shear tie strap is placed in a shear transfer system.

Referring to FIG. 3, a framed building 305 comprises a dormer 306 comprising a dormer wall 310. The dormer wall 310 comprises dormer studs 320. The framed building also comprises a roof 330 comprising a first rafter 331 (or trimmer), a second rafter 332, and blocking 333 between the first rafter 331 and the second rafter 332. The first rafter 331 forms an intersection 340 between the roof 330 and the dormer wall 310. The second rafter 332 is distal to the dormer wall 310 relative to the first rafter 331. The first framing member may be the first rafter 331, the second framing member and the third framing member are provided by blocking # between the dormer studs 320, and the fourth framing member and the fifth framing member may be respective portions of the blocking 333. Here the blocking is arranged so that the shear tie strap can be installed on an interior of the structure and bent at 90 degrees so that the termini are connected to each of the blocking members, and the first and second connecting straps 181, 182 are aligned with and lie on the blocking 333, #.

Still referring to FIG. 3, the framed building 305 may also comprises a dormer header 380, a dormer roof 350, dormer rafters 360, and a valley framing member 370 forming an intersection between the roof 330 and the dormer roof 350. The first framing member may be the valley framing member 370, the second framing member and third framing member may be respective dormer rafters 360, the fourth framing member may be the header 380, and the fifth framing member may be the trimmer 331, or blocking installed between these framing members.

Figure 4:
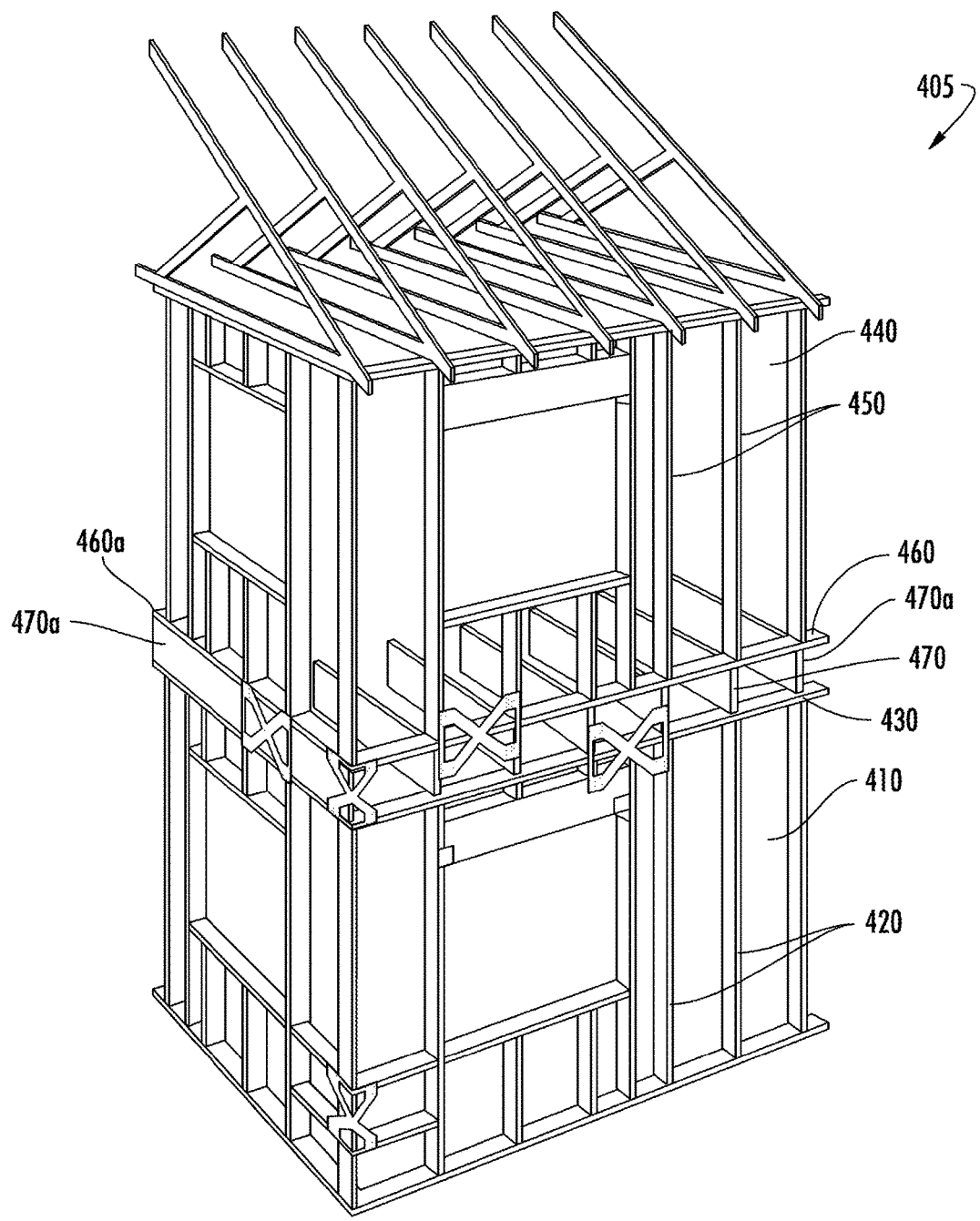
FIG. 4 illustrates a first level and a second level of a framed building where a shear tie strap is placed in a shear transfer system.

Referring to FIG. 4, the framed building 405 may comprises a first level wall 410 comprising first level studs 420 attached to a top plate 430, and a second level wall 440 above the first level wall 410. The second level wall 440 may comprise second level studs 450 and a bottom plate 460, to which the second level studs are attached. The framed building may also comprise joists interposed between the top plate and the bottom plate. The first framing member could be selected from one of the top plate 430, the bottom plate 460, and one of the joists 470.

A shear tie strap may be positioned along the length of one of the exterior joists 470*a* as the first framing member. The second framing member and the third framing member may be respective first level studs, and the fourth framing member and the fifth framing member may be respective second level studs 450.

When the first framing member is the bottom plate 460, the second framing member and the third framing member may be respective joists 470 or first level studs 420. The fourth framing member and the fifth framing member may be respective second level studs 470.

When the first framing member is the top plate 430, the second framing member and the third framing member may be respective first level studs 420. The forth framing member and the fifth framing member may be respective joists 430.

As illustrated in FIG. 4, a shear tie strap could be attached to a variety of locations. The first framing member could be a corner post, a joist, the top plate, the bottom, plate or other framing members. The corresponding second, third, fourth, and fifth framing members would be surrounding framing members at orthogonal or oblique angles to the first framing member. These could be the ends of joists, wall studs, the top or bottom plates, or other framing members. When the surrounding frame lacks sufficient framing members as usually framed, blocking or bracing may be added and serve as at least one of the second, third, fourth, or fifth framing members.

The representation of two levels in FIG. 4 and the illustrated locations of the shear tie strap 160 are merely exemplary. A framed building may have more than two levels. In the case of a framed building with more than two levels, the first level may be designated from any level other than the top level. Framing members from the first level may be selected from the designated first level, and the second level components would be selected from the level above the designated first level.

Figure 5:
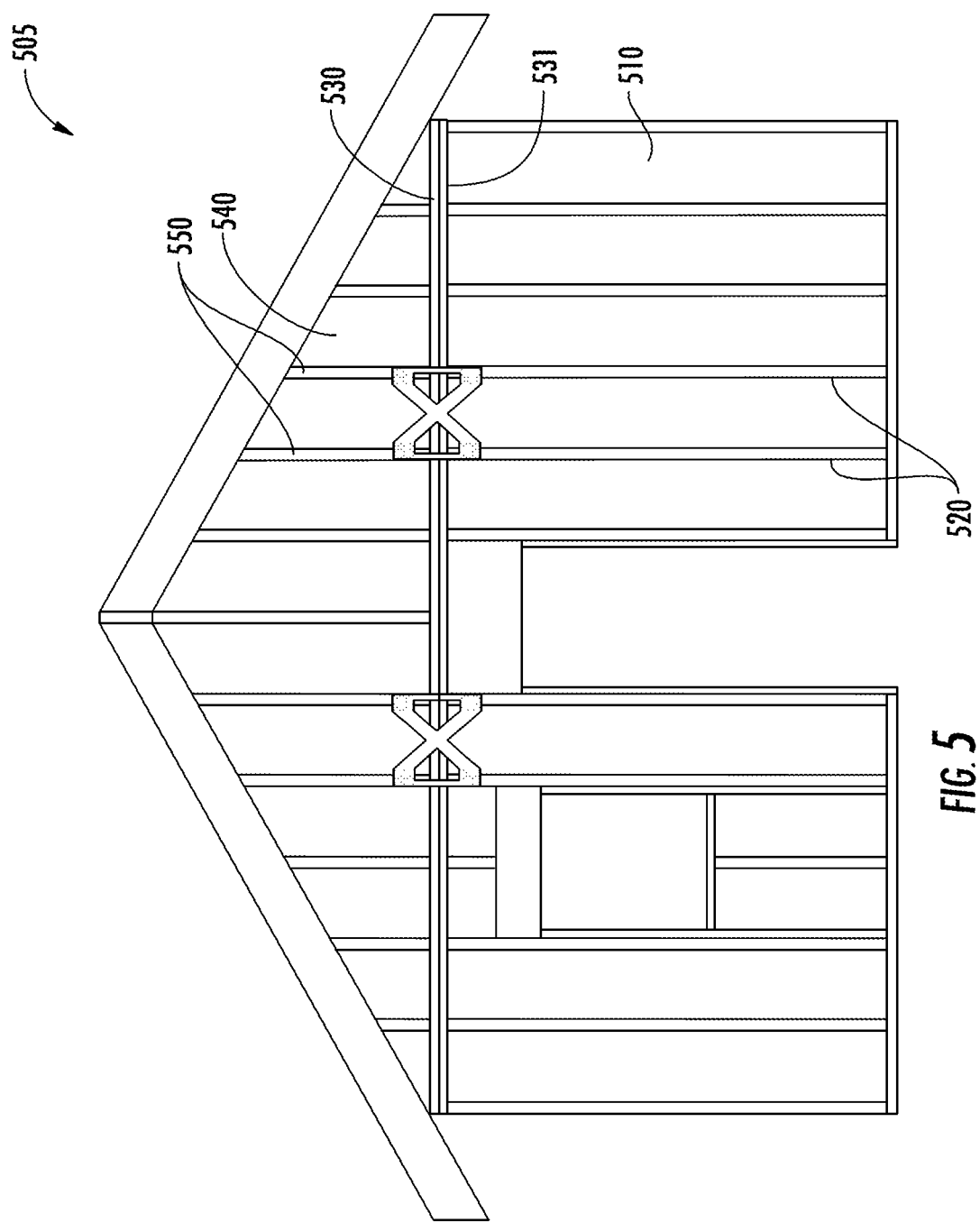
FIG. 5 illustrates a gable of a framed building where a shear tie strap is placed in a shear transfer system.

Referring to FIG. 5, the framed building 505 may comprises a wall 510 comprising wall studs 520, and a top plate 531. The framed building may also comprise a gable 540 above the wall 510 that comprises gable studs 550 attached to an end plate 530. The first framing member may be the end plate 530 or the top plate 531. The second framing member and the third framing member may be respective wall studs 520, and the fourth framing member and fifth framing member may be respective gable studs 550. If joist are interposed between the top plate and the end plate, the selection of framing members may be as described with respect to multiple levels and FIG. 4. The illustrated locations of the shear tie strap 160 are merely exemplary.

Figure 6:
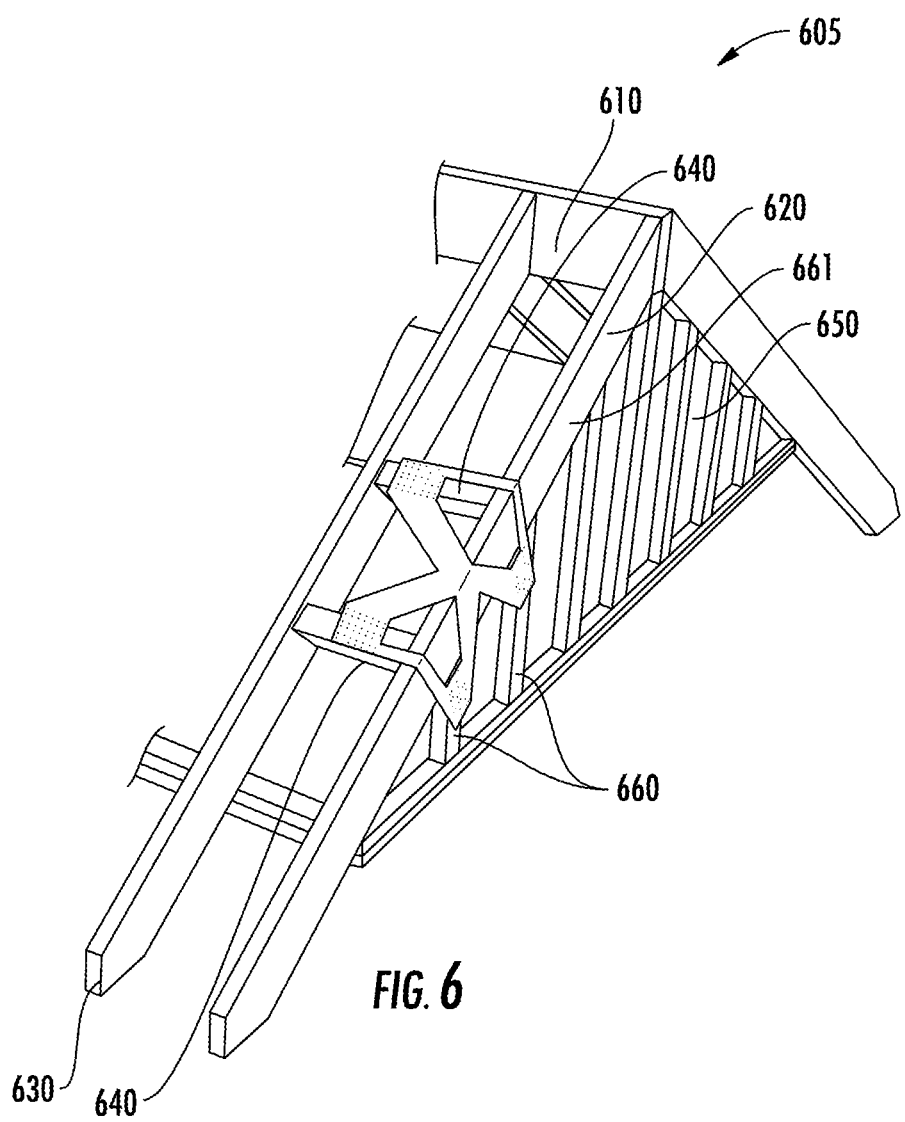
FIG. 6 illustrates a gable of a framed building where a shear tie strap is placed in a shear transfer system.

Referring to FIG. 6, the framed building 605 may comprises a roof 610 comprising an exterior rafter 620, an interior rafter 630, and blocking members 640 between the exterior rafter 620 and the interior rafter 630. The framed building may also comprise a gable 650 comprising gable studs 660. The first framing member may be an arm 661 of the exterior rafter 620, the second framing member and the third framing member may be respective gable studs 660 or blocking located therebetween, and the fourth framing member and fifth framing member may be respective ones of the blocking 640.

Figure 7:
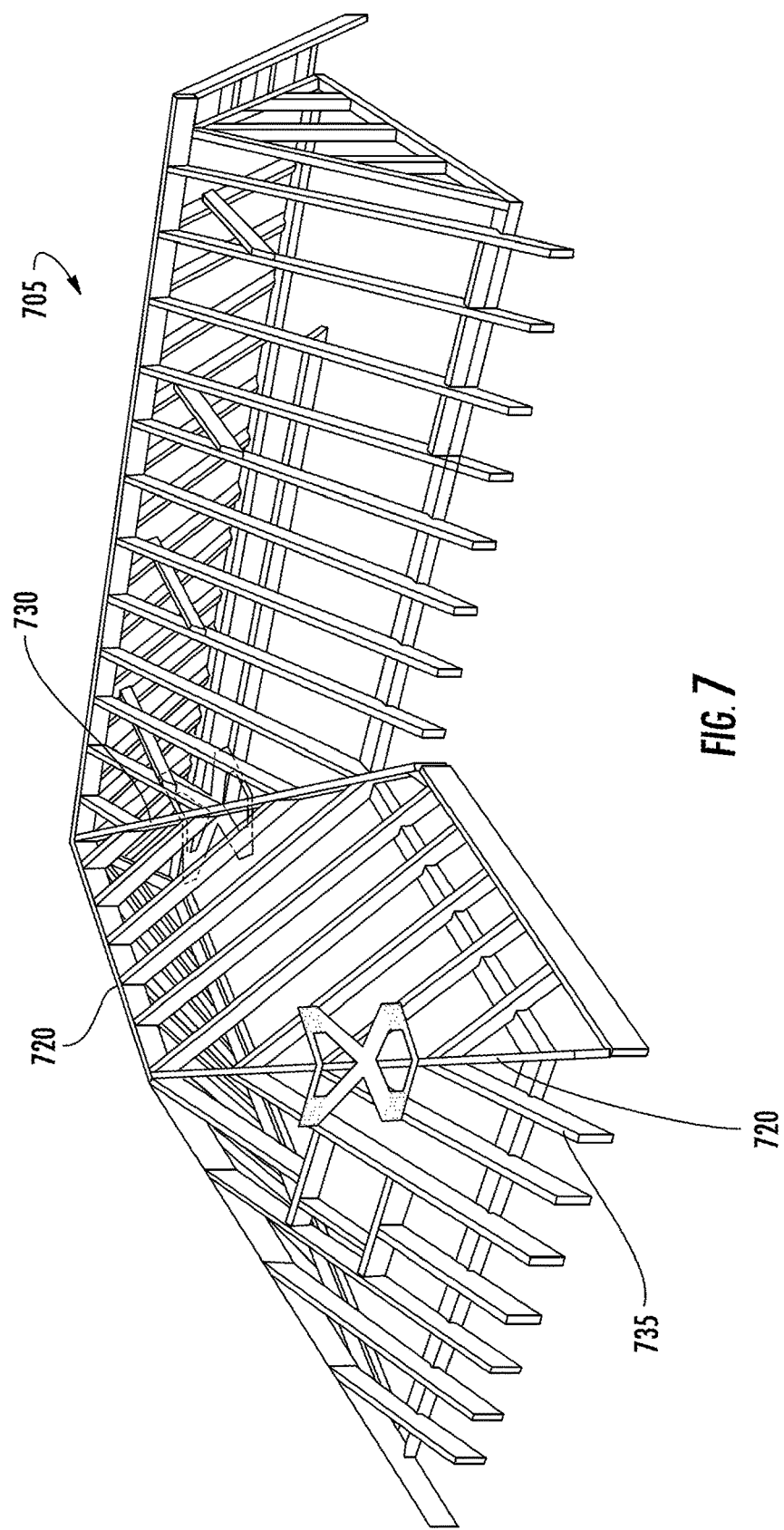
FIG. 7 illustrates a hip roof of a framed building where a shear tie strap is placed in a shear transfer system.

Referring to FIG. 7, the framed building 705 may comprise a hip roof 710 comprising a hip rafter 720. The first framing member may be the hip rafter. The second framing member and the third framing member may be selected from a hip jack rafter 735, or any suitable blocking or framing member to the left of the hip rafter 720. The fourth framing member and the fifth framing member may be similarly selected from any suitable blocking or framing member to the right of the hip rafter 720. Given the angles of hip rafters, blocking or other suitable structure will be required as at least one of the second, third, fourth, or fifth framing member.

Still referring to FIG. 7, the framed building 705 may comprises a valley rafter 730, and the first framing member may be the valley rafter 730. The second, third, fourth, and fifth framing member could be selected from suitable framing elements surrounding the valley rafter, including blocking. In this case, the shear tie strap would need to be located in an interior of the building structure.

Shear tie straps and shear tie systems implementing the shear tie straps are described in PCT/US2015/021456, which was filed Mar. 19, 2015, was titled Shear Tie System For Vented Roof Ridge, and is incorporated herein by reference as if fully set forth. Any shear tie strap therein may be in a shear transfer system herein.

Figure 8:
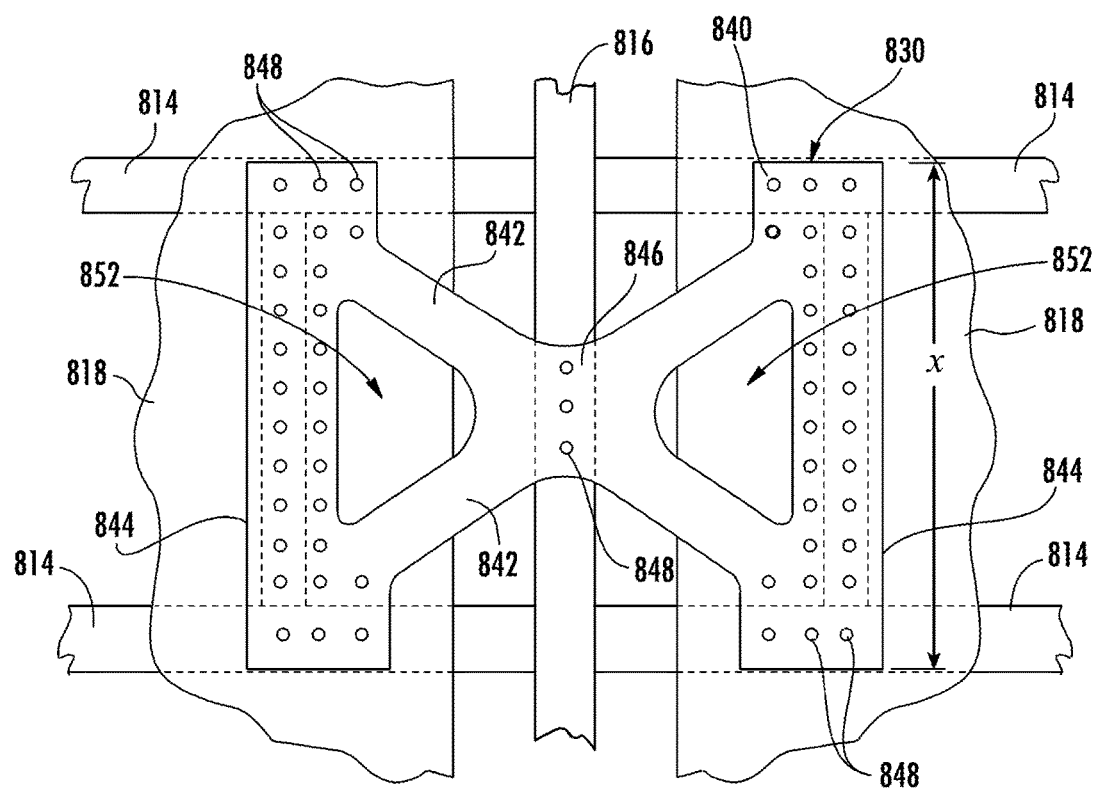
FIG. 8 illustrates a shear tie strap.
Figure 9:
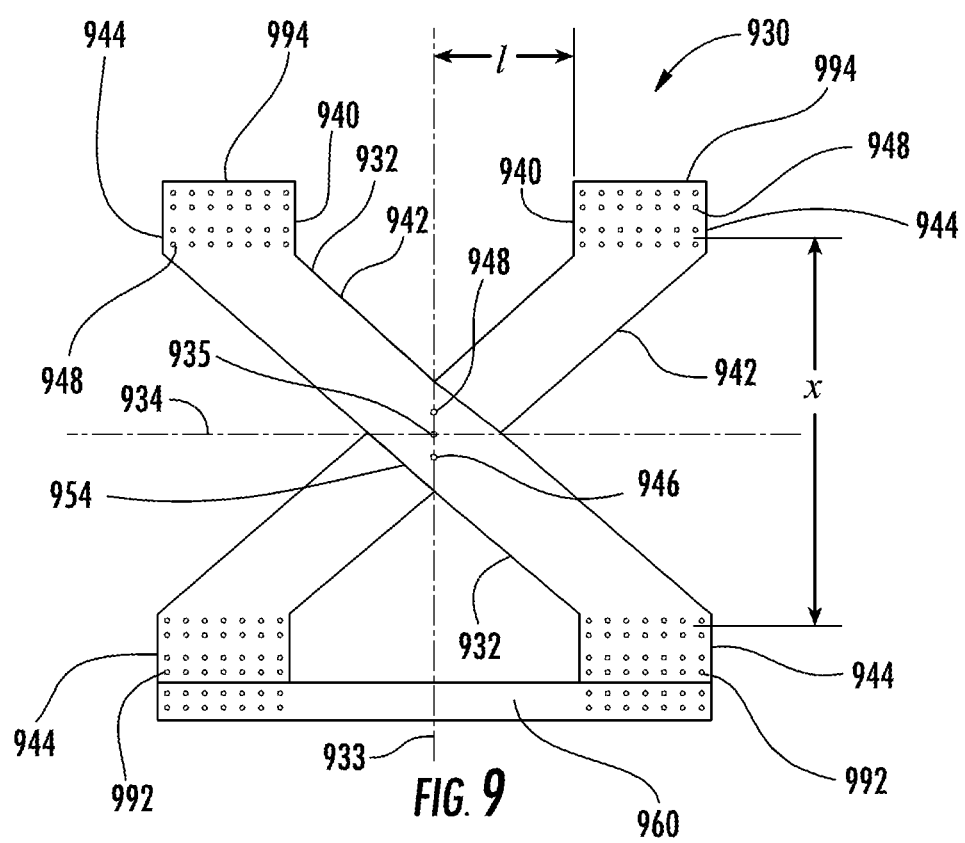
FIG. 9 illustrates a shear tie strap.

FIGS. 8 and 9 illustrate shear tie straps that may be provided as a shear tie strap in a shear transfer system herein. A shear tie strap 830 (FIG. 8) or a shear tie strap 930 (FIG. 9) may take the place of any shear tie strap in a shear transfer system described herein. The shear ties straps illustrated in FIGS. 1, 8, 9, and 10 are merely exemplary. Modifications of a shear tie strap within the spirit of the disclosure herein are contemplated in embodiments herein.

Referring to FIG. 8, a shear tie strap 830 is illustrated. The shear tie strap of FIG. 1 or FIG. 10 may be replaced with any similar structure providing a generally "X" shaped configuration. The shear tie strap 830 may be connected to a first framing member, a second framing member, a third framing member, a fourth framing member, and a fifth framing member, and to sheathing. Non-limiting examples of these members are illustrated with reference to FIGS. 2 through 7 and 11.

A shear tie strap may be formed of a stamped sheet metal body. As illustrated in FIG. 8, the body 840 of the shear tie strap 830 includes cross straps 842 in order to transfer shear forces across a first framing member that the shear tie strap is attached to from one longitudinal end of the shear to strap to on the opposite longitudinal end; and thereby from one set of framing members to another. Nailer strips 844 are provided at the termini of and connect these cross straps 842, and a center nailer strip 846 is provided with an enlarged area for connection to the first framing member 816. Preferably holes 848 are pre-formed in the stamped sheet metal body 840 for the shear tie strap 830. These can be punched at the same time that the sheet metal body 840 is punched or can be drilled or punched afterwards in a separate step. While a representative pattern for these pre-formed holes 848 is shown, those skilled in the art will recognize that other patterns can be used.

As shown in FIG. 8, preferably the shear tie strap 830 has a width X that is designed to extend between adjacent framing members 814. In an embodiment, this dimension is 17.5 inches or 25.5 inches in order to allow the shear tie strap 830 to span adjacent members 814 that are located at 16 inches on center or 24 inches on center. However, other widths can be provided in order to accommodate the spacing between framing members 814.

The shear tie strap 830 may be installed using nails or screws between adjacent framing members 814 and may be connected to the first framing member 816 as well. Depending upon the shear loads anticipated due to either earthquake or wind (for example, hurricane) conditions, the shear tie straps 830 can be located between contiguous pairs of framing members 814 along a framed building, or can be spaced apart further, as required.

In an embodiment, the shear tie strap 830 is punched from 20 gauge sheet metal. However, other thicknesses of sheet metal can be utilized, depending upon the loads required for the particular application.

Blocking 850 can be installed between the adjacent members 814 in a position aligned with the nailer strip ends 844 of the shear tie strap 830. Preferably, these are located approximately 7-10 inches away from the first framing member 816. However, depending upon the particular application, these can be omitted or may be provided with different spacing.

Referring to FIG. 9, an embodiment of the shear tie strap 930 is depicted. Shear tie strap 930 may be a single integral unit, preferably of sheet metal. Alternatively, shear tie strap 930 may be multiple, assembled parts. The assembled parts may be fixed to one another by any suitable structure. For example, pre-drilled holes in separate elements may be aligned and the elements fastened by inserting a nail, screw, or any other suitable fastener. The shear tie strap 930 comprises sheet metal bodies 940, each comprising a cross strap 942 with nailer strips 944 provided at opposite ends of each cross strap 942. The sheet metal bodies 940 may be mirror images of each other about the longitudinal axis 933 as depicted, although other configurations may be used. The sheet metal bodies 940 may be used as pairs, with one cross strap 942 overlapping over the other cross strap 942 at an intermediate region 954 wherein the overlapping intermediate regions 954 form at least part of a center nailing strip 946. As stated above, however, a shear tie strap may be an integral unit. When the shear tie strap 930 is a single, integral unit, the sheet metal bodies 940 and cross straps 942 are a single structure. In such an integral embodiment, the cross straps may be described as intersecting at intermediate regions.

The shear tie strap 930 may be connected to a first framing member, a second framing member, a third framing member, a fourth framing member, and a fifth framing member, and to sheathing. Non-limiting examples of these members are illustrated with reference to FIGS. 2 through 7 and 11. The two cross straps 942 may extend at an acute angle to first framing member, and include or be connected to the nailer strips 944. The center nailer strip 946 may be implemented for attachment to the first framing member. Longitudinal axis 933 in FIG. 9 represents the position of the first framing member when the shear tie strap 930 would be installed. The shear tie strap has a first longitudinal end 992 and a second longitudinal end 994. On the first longitudinal end 992, the termini of the cross straps 942 with nailer strips 944 are spaced apart in a first longitudinal direction, from the center 935 along longitudinal axis 933. On the second longitudinal end 994, the termini of the cross straps 942 with nailer strips 944 are spaced apart in a second longitudinal direction, from the center 935 along longitudinal axis 933. When installed, the first longitudinal end 992 would include the nailer strips 944, on cross straps 942, spaced apart from the center 935 in the first direction toward a first longitudinal end of the first framing member. And the second longitudinal end 994 would include the nailer strips 944, with cross straps 942, spaced apart from the center 935 in the second direction toward a second end of the ridge beam and opposite to the first direction.

Also illustrated in FIG. 9 is connecting strap 960. There may be no connecting strap, or a single connecting strap 960 connected at the termini of the cross straps 942 on the first longitudinal end 992 of the shear tie strap 930. FIG. 9 illustrates the connecting strap 960 associated with the nailer strips 944 at the termini of the cross straps 942. But a connecting strap may connect the cross straps 942 at the first longitudinal end 992 as illustrated or at an intermediate position between the ends of the cross straps 942 and the center 935. As illustrated in FIG. 9, the connecting strap may span from one side of the shear tie strap to the other. A connecting strap may have a nailing strip(s) with pre-drilled holes, also as illustrated in FIG. 9. There may be a second connecting strap (not illustrated) connected at the ends of the cross straps 942 at the second longitudinal end 994 of the shear tie strap 930. As with the first connecting strap 960, the second connecting strap may be associated with the nailer strips 944, or at an intermediate position between the ends of cross straps 942 and the center 935. At least one of a third connecting strap or fourth connection strap connecting the remaining termini may also be provided.

The connecting strap(s) may be integral with at least one of the respective cross straps connected, or the nailing strips thereon. Alternatively, the connecting strap(s) may be provided as an additional element and fixed to the respective ends of the shear tie strap 930.

In some embodiments, one or more preformed holes 948 are formed in the intermediate regions 954. In embodiments having separate sheet metal bodies, the hole or holes may align when the cross straps 942 overlap in a predetermined orientation.

When the cross straps 942 are overlapped in a predetermined orientation or when formed as an integral unit, the shear tie strap 930 has a width X of sufficient size so that at least some preformed holes 948 will be aligned with adjacent framing members such that nails or screws may be used to fasten the shear tie strap 930 to the framing members. Width X may be any dimension that represents an on-center spacing of framing members. For example, 16 or 24 inches. However, other sizes can be used depending upon a particular building structure where the shear tie strap is installed and associated standards.

Preferably, the shear tie straps comprise sheet metal bodies made of 16 gauge to 20 gauge sheet metal with a yield stress of 33 ksi. In one preferred arrangement, these may be installed with 10$d$ common nails, with at least 8 nails in in each of the fastener strips at each termini of a shear tie strap and into the underlying framing members. A connecting strap may be 1.5 inches in width.

The embodiments illustrated through FIGS. 1 through 7 included a first framing member attached to the center of a shear tie strap. There may be instances where to framing elements separated by a width could be attached to a shear tie strap off center. The attachment, as illustrated with respect to FIGS. 1 through 9, could be adapted. Fasteners may be offset from the center to engage the framing elements separated by a width.

Figure 10:
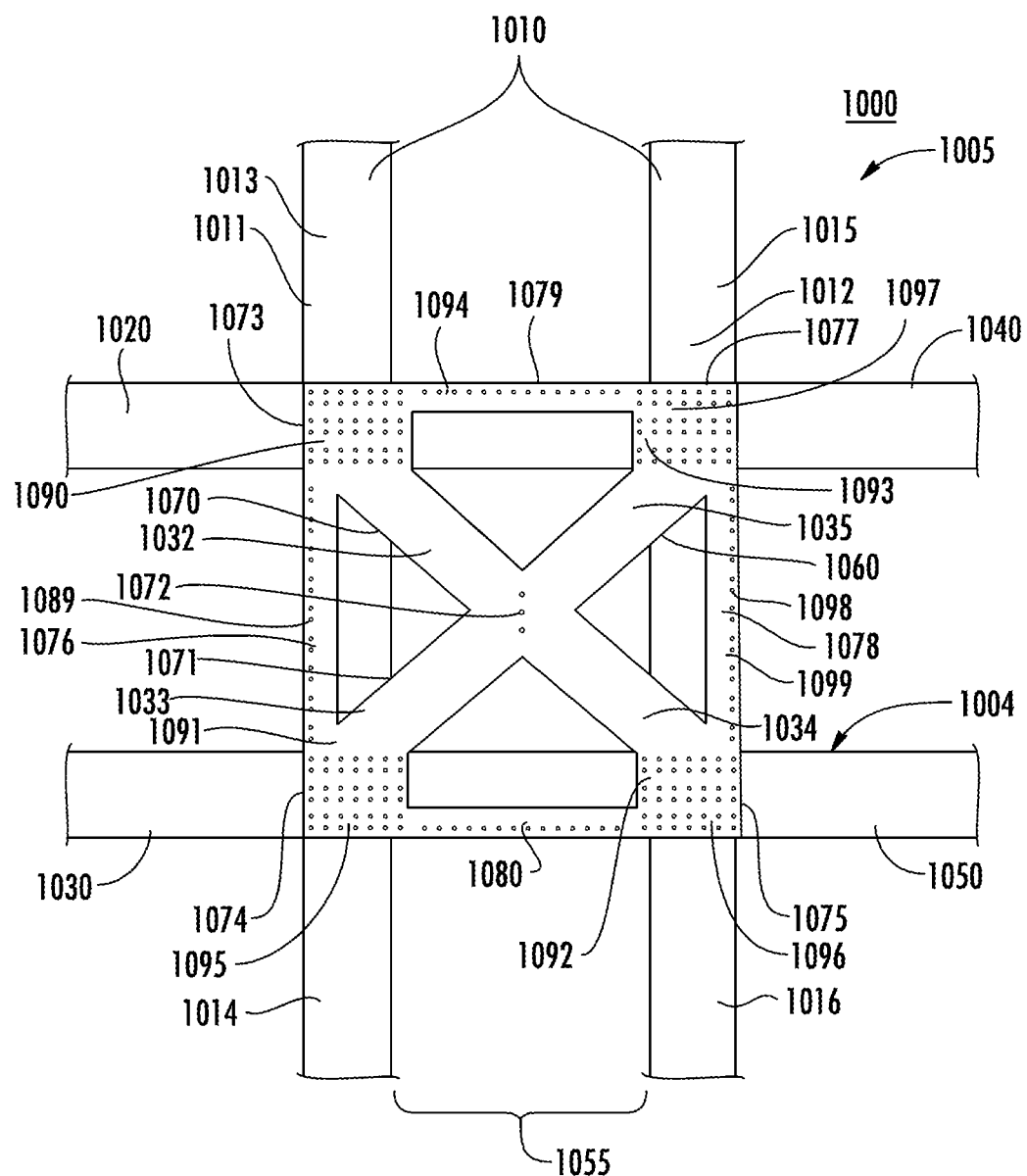
FIG. 10 illustrates a general shear transfer system where a shear tie strap is attached to the framing of a framed building.
Figure 17:
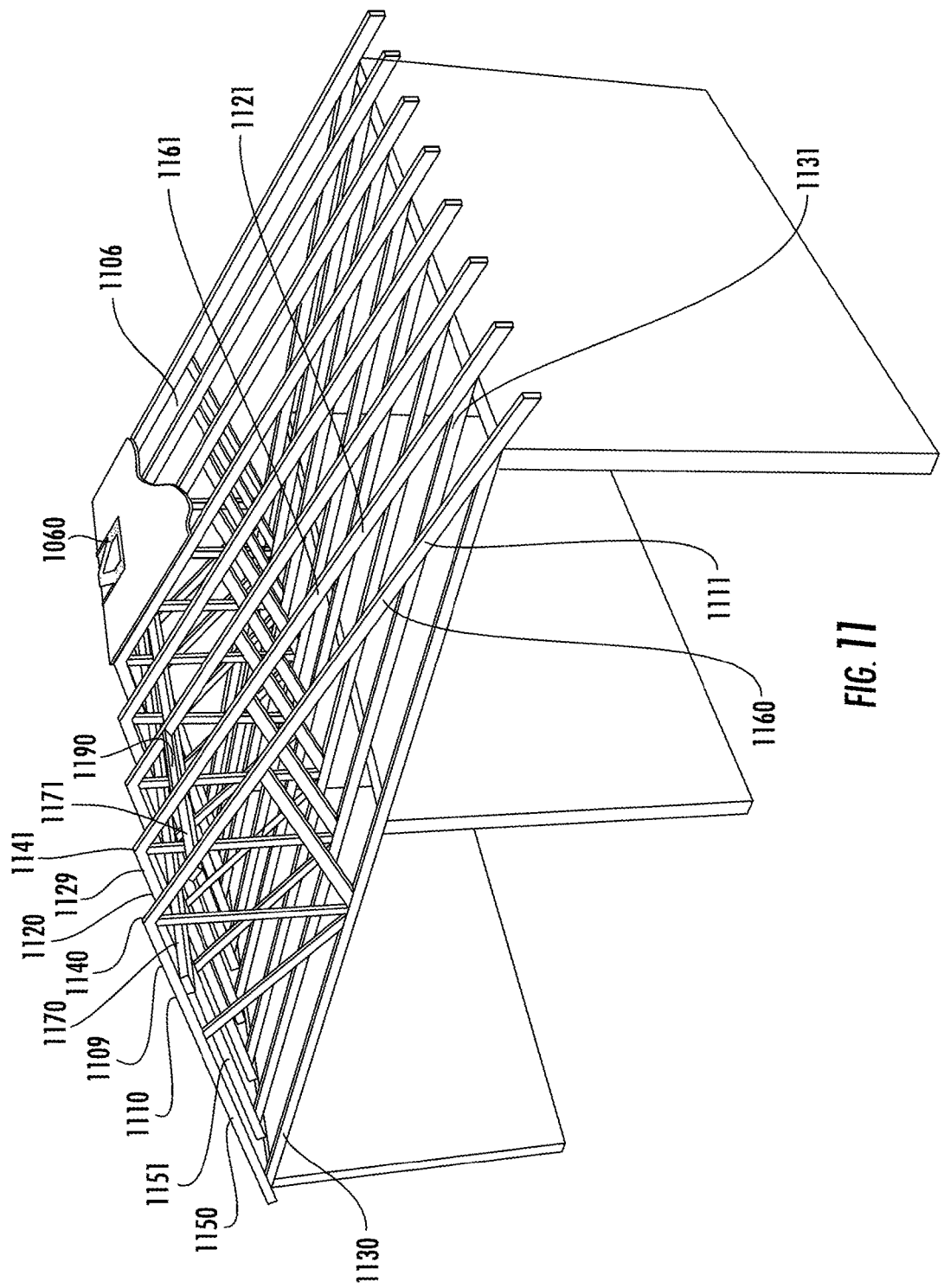

Referring to FIG. 10, a shear transfer system 1000 is illustrated. The shear transfer system 1000 may comprise a first framing element 1011 and a second framing element 1012. The first framing element 1011 and the second framing element 1012 may be separated by a width 1055. Each of the first framing element 1011 and the second framing element 1012 may comprise a respective length, a respective first end 1013, 1015, and a respective second end 1014, 1016. Each of the first framing element 1011 and the second framing element 1012 may be integrated in a frame 1004 of a framed building 1005. The first framing element 1011 and the second framing element 1012 carry loads in a same direction as the first framing member of the prior embodiments.

The shear transfer system 1000 may also comprise a second framing member 1020, a third framing member 1030, a fourth framing member 1040, a fifth framing member 1050, and a shear tie strap 1060.

The second framing member 1020 and the third framing member 1030 may extend across the first framing element 1011 and toward the second framing element 1020 across the width 1055. The fourth framing member 1040 and the fifth framing member 1040 may extend across the second framing element 1012 and toward the first framing element 1011 across the width 1055. The second framing member 1020 may oppose the fourth framing member 1040 in the frame 1003. The third framing member 1030 may oppose the fifth framing member 1050 in the frame 1004.

The shear tie strap 1060 comprises a first cross strap 1070 and a second cross strap 1071 that intersect or cross. The shear tie strap 1060 also comprises a center 1072 where the first cross strap 1070 and second cross strap 1071 intersect or cross. Respective termini may be located at each end of each cross strap. As illustrated in FIG. 10, the shear tie strap 1060 includes a first termini 1073, a second termini 1074, a third termini 1075, and a fourth termini 1077. A first arm 1032 radiates from the center 1072 of shear tie strap 1060 toward the upper left, as illustrated in FIG. 10. A second arm 1033 radiates from the center 1072 of shear tie strap 1060 toward the lower left, a third arm 1034 radiates from the center 1072 toward the lower right, and a fourth arm 1035 radiates toward the upper left, also as illustrated in FIG. 10.

The shear tie strap 1060 may include zero, one, two, three, or four connecting straps. The shear tie strap 1060 illustrated in FIG. 10 comprises a first connecting strap 1076 connecting the first termini 1073 to the second termini 1074, a second connecting strap 1078 connecting the third termini 1075 to the fourth termini 1077, a third connecting strap 1079 connecting the first termini 1073 to the fourth termini 1077, and a fourth connecting strap 1080 connecting the second termini 1074 with the third termini 1075. The first termini 1073 and the third termini 1075 may be alternately referred to as the first termini and second termini, respectively, of the first cross strap 1070. The second termini 1074 and the fourth termini 1077 may be alternately referred to as the first termini and second termini, respectively, of the second cross strap 1071.

When a shear transfer system 1000 includes the shear tie strap 1060 with the four connecting straps, as illustrated in FIG. 10, the first connecting strap 1076 may be attached to the first framing element 1011, the second connecting strap 1078 may be attached to the second framing element 1012, the third connecting strap 1079 may be attached to the second framing member 1020 and the fourth framing member 1040, and the fourth connecting strap 1080 may be attached to the third framing member 1030 and the fifth framing member 1050.

Fastener strips may be provided in the shear tie strap 1060. As illustrated, there are fastener strips 1090, 1091, 1092, and 1093 associated with each termini. FIG. 10 also illustrates fastener strips 1094 and 1097 on ends of the third connecting strap 1079, fastener strips 1095 and 1096 on ends of the fourth connecting strap 1080, a fastener strip 1098 at the center 1072, a fastener strip 1089 on the first connecting strap 1076, and a fastener strip 1099 on the second connecting strap 1078.

The description of variations of the shear transfer system 100 relative to FIGS. 1 through 7 may be adapted to the shear transfer system 1000 while retaining the elements specific to shear transfer system 1000. Any set of two parallel or substantially parallel appropriately spaced framing elements in a framed building may be selected as the first framing element 1011 and the second framing element 1012. Framing elements or blocking that are either orthogonal or oblique to the first framing element 1011 or the second framing element 1012 may be selected as the second framing member 1020, the third framing member 1030, the fourth framing member 1040, and the fifth framing member 1050. Orthogonal elements may be preferred.

Also in common with the shear transfer system 100, the shear transfer system 1000 may be adapted to a wide variety structures in a framed building. The representation in FIG. 10 appears planar, and the shear transfer system 1000 may include a planar shear tie strap 1060 attached to framing members within the same plane. However, a shear transfer system 1000 may include a shear tie strap 1060 where each arm is angled to conform to the surface of the framed building upon which it is attached. For example, the first arm 1032 and the second arm 1033 may be configured in an angle that conforms to the angle of a roof over its peak or a building corner relative to third arm 1034 and fourth arm 1035. Each arm may have a different angle relative to a midline of the shear tie strap 1060 through the center 1072 and parallel to the first portion 1011 or second portion 1012 of the first set of framing members 1010. Each arm may have a different twist relative to the center 1072 to conform to the surface of the framed building.

Referring to FIG. 11, a framed building 1105 comprising a truss roof 1106 is illustrated. The roof 1106 comprises a first truss 1109 comprising a first top chord 1110, a second top chord 1111, a bottom chord 1130, and a peak 1140. The roof 1106 also comprises a second truss 1129 comprising a first top chord 1120, a second top chord 1121, a bottom chord 1131, and a peak 1141. The first truss 1109 also comprises a first side 1150 disposed on one side of the roof 1106, and a second side 1160 disposed on the other side of the roof, relative to peak 1140. The second truss 1129 also comprises a first side 1151 disposed on one side of the roof 1106, and a second side 1161 disposed on the other side of the roof, relative to peak 1141.

The roof 1106 may also comprise a first stringer 1170 on one side of the roof, and a second stringer 1171 on the other side of the roof, relative to the peaks of the trusses. Each stringer is fastened to the interior side of the top chords of a row of trusses in the roof. As illustrated, the first stringer connects each top chord of each truss along one side of the roof, and the second stringer connects each top chord of each truss along the other side of the roof, relative to the truss peaks.

Shear tie strap 1060 may be configured to conform to the roof 1106 over the peaks. The shear tie strap 1060 is bent to the angle of the roof and extends over the peak with the center 1072 being located at the peak. The sheathing at the peak is located in the position of the first framing member 110 in the prior examples, although it is not a framing member per se, and the load paths are carried via the shear tie strap 1060 into the adjacent truss members and the stringers, as discussed below. Further, the shear tie strap 1060 may be located any position along the peak of the roof where adjacent trusses may be engaged. Sheathing is not illustrated for most of the roof 1106 area illustrated in FIG. 11 for clarity, but sheathing may be present. Further, the sheathing is interposed between the shear tie strap 1060 and the first stringer 1170 and the second stringer 1171. A portion of the sheathing is shown at the rear of roof 1106 and under shear tie strap 1060. Blocking 1190 is provided between top chords of adjacent trusses between first stringer 1170 and the sheathing, and also between the second stringer 1171 and the sheathing to fill space between the stringers and the sheathing, and provide anchoring points for fasteners. The blocking 1190 may be fastened to at least one of the proximal top chords or the associated stringer. For sake of illustration, blocking 1190 is shown outside of the area where sheathing and shear tie strap 1060 is illustrated.

The shear tie strap 1060 is fastened to the first stringer 1170 and the second stringer 1171. Fasteners are installed through fastener strips 1089 and 1098 and into the first stringer and second stringer, or blocking associated therewith. In this configuration, the second framing member and the fourth member are the top chords of the first truss (for example, the first truss 1109) in the roof 1106. The third framing member and the fifth framing member are the top chords of a truss next to the first truss (for example, the second truss 1129). The first framing element 1011 and the second framing element 1012 are the first stringer 1170 and the second stringer 1171.

The description of each of FIGS. 2 through 7 identified framing members to which the shear tie strap 160 may be attached. The description of FIG. 11 identified framing members to which the shear tie strap 1060 may be attached. Shear tie strap 1060 may also be attached to framing members illustrated in FIGS. 2 through 7. Attachment of any shear tie strap may be achieved by driving fasteners through the material of the shear tie strap, or through fastener strips on the shear tie strap, if present, and into the framing members.

In the description of each of FIGS. 2 through 7 and 11 a set of elements for attachment of one shear tie strap is identified. As illustrated in some representations, two or more shear tie straps may be associated with a framed building. For example, multiple shear tie straps may be associated with a corner post. Or multiple shear tie straps may be positioned along the peak of a trussed roof.

In an embodiment, a shear tie strap is provided. A shear tie strap illustrated in any of FIGS. 1-12 represents one embodiment of a shear tie strap. Any shear tie strap described or illustrated herein is an embodiment herein. Any shear tie strap herein could be in a shear transfer system herein. A shear tie strap may have the appearance of an X with no connecting straps. Or a shear tie strap may have more than one connecting strap between two or more of the various cross straps.

Figure 12:
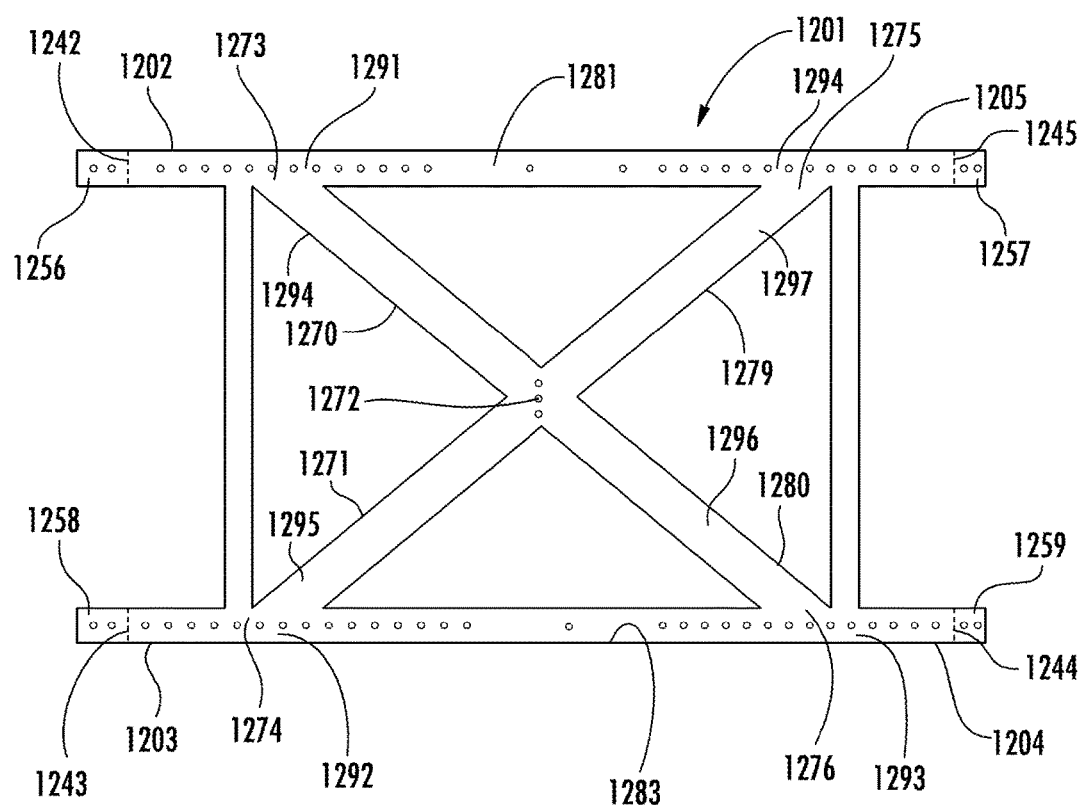
FIG. 12 illustrates a shear tie strap.

An embodiment of a shear tie strap is illustrated in FIG. 12. The shear tie strap 1201 comprises two cross straps. As illustrated in FIG. 12, the shear tie strap has a first cross strap 1270, a second cross strap 1271, a center 1272, where the two cross straps intersect or cross, and termini at each end of both cross strap. The center 1272 of the shear tie strap may be attached to the first framing member.

The termini may be referred to as termini one 1273, termini two 1274, termini three 1275, and termini four 1276. With reference to FIG. 1 and FIG. 12, termini one 1273 may be adapted to attach to a second framing member like the second framing member 120, termini two 1274 may be adapted to attach to a third framing member like the third framing member 130, termini three 1275 may be adapted to attach to a fourth framing member like the fourth framing member 140, and termini four 1276 may be adapted to attach to a fifth framing member like the fifth framing member 150.

The portion of the shear tie strap spaced apart from the center of the shear tie strap in a first direction toward the first end of the first framing member may be referred to a first longitudinal end 1279. Likewise, the portion of the shear tie strap spaced apart from the center of the shear tie strap in a second direction toward a second end of the first framing member, and opposite to the first direction, may be referred to as a second longitudinal end 1280. With reference to FIG. 1 and FIG. 12, the termini on the first longitudinal end (termini one 1273 and termini three 1275) may be adapted to respectively attach to a second framing member like the second framing member 120 and a fourth framing member like the fourth framing member 140, and the termini on the second longitudinal end (termini two 1274 and termini four 1276) may be adapted to respectively attach to a third framing member like the third framing member 130 and a fifth framing member like the fifth framing member 150. Each section of a shear tie strap radiating from the center may be referred to as an arm. For example, the shear tie strap 1201, as illustrated in FIG. 12, includes a first arm 1294 radiating toward the upper left from the center 1272, a second arm 1295 radiating to the lower left from the center 1272, a third arm 1296 radiating toward the lower right from the center 1272, and a fourth arm 1297 radiating toward the upper right from the center 1272. Each arm may have a different angle relative to a midline of the shear tie strap 1201 which extends through the center 1272 and is vertical as represented in FIG. 12. As used here, "vertical" refers to the orientation in FIG. 12 and the skilled artisan would understand that the shear tie strap is adapted to be attached to a frame in a variety of orientations such that the midline described here takes orientations other than vertical with respect to the framed building. Each arm may have a different fold and/or twist relative to the center 1272 to conform to the surface of the framed building.

A shear tie strap herein may comprise fastener strips comprising fastener engagement areas to attach the shear transfer system to framing members. The fastener strips may be adapted to receive any type of fastener to fix a shear tie strap to framing members. In an embodiment, the fasteners are nails and the fastener strip may be referred to as a nailer strip or nailing strip. The fastener engagement areas may be holes through which nails or other fasteners may be driven. A fastener strip may include one or more fastener engagement areas. FIG. 12 illustrates the shear tie strap 1201 with fastener strips 1291, 1292, 1293, and 1294 (dots represent fastener engagement areas) located at the termini 1273, 1274, 1275, and 1276, respectively. Shear tie strap 1201 is also illustrated with a fastener strip (three dots) at the center 1272. A variety of different configurations of fastener strips and numbers of fastener engagement areas may be provided.

A shear tie strap may comprise at least one connecting strap. As illustrated in FIG. 12, the shear tie strap 1201 includes four connecting straps. A first connecting strap 1281 may be adapted to extend over a first framing member like the first framing member 111 and connect the cross straps (through connection with termini 1273 and 1275) on the first longitudinal end 1279 of the shear tie strap 1201. And a second connecting strap 1283 may be adapted to extend over a first framing member like the first framing member 111 and connect the cross straps on the second longitudinal end 1280 of the shear tie strap 1201. A third connecting strap 1285 may connect termini 1273 and 1274, and a fourth connection strap 1287 may connect termini 1275 and 1276. A connecting strap may be at the termini of cross straps, as illustrated, or at an intermediate position between the termini at one end of a shear tie strap and the center. The embodiment illustrated in FIG. 12 includes four connecting straps. But a shear tie strap may have no connecting strap. A shear tie strap may include one connecting strap between any two neighboring termini. A shear tie strap may include two connecting straps. A shear tie strap may include three connecting straps, connecting all but one of the neighboring termini. A shear tie strap may also include four connecting straps, connecting all four of the neighboring termini.

A shear tie strap may be one integral unit comprising a first cross strap, a second cross strap, and any connecting straps that may be present. A shear tie strap herein may be comprised of separate parts that are fixed to one another. A shear tie strap herein may be comprised of a combination of integral components forming an integral unit and one or more separate parts fixed to the integral unit.

The shear tie strap 1201 also includes an extension 1202, an extension 1203, an extension 1204, and an extension 1205. One or more of the extensions 1202, 1203, 1204, or 1205 may include a fastener strip. One or more of the extensions 1202, 1203, 1204, or 1205 may include a score line. Score lines 1242, 1243, 1244, and 1245 are illustrated in FIG. 12. One or more of the extensions 1202, 1203, 1204, or 1205 may be adapted to attach to a framing member. The framing member may be the same as the framing member to which the termini adjacent to the extension is attached. The framing to which an extension attaches may be a member proximal to the framing member to which the termini adjacent to the extension is attached. One or more of the extensions 1202, 1203, 1204, or 1205 may be adapted to bend or be bent to conform to framing elements. The bending may be stress bending. In an embodiment, the extensions 1202, 1203, 1204, or 1205 wrap to a different face of the framing member to which the associate arm of the shear tie strap 1201 is attached. Regions 1256, 1257, 1258, and 1259 between the respective score lines and outer ends of the respective extensions may wrap to a different face of the framing member, and may be attached to the framing member. An extension may be attached to the different face of the framing member. For example one or more of the extensions 1202, 1203, 1204, or 1205 may be attached to the frame in a position to resist vertical lift.

The shear tie strap of FIG. 12 may be implemented in a shear transfer system herein.

A shear tie strap illustrated or described herein may be adapted to a wide variety structures in a framed building. The representation in FIG. 12 appears planar, and a shear transfer system may include a planar shear tie strap attached to framing members within the same plane. However, a shear transfer system may include a shear tie strap where each arm is angled to conform to the surface of the framed building upon which it is attached. For example, the shear tie strap 1201 may include the first arm 1294 and the second arm 1295 at a 90 degree angle with respect to the third arm 1293 and the fourth arm 1297 when the center 1272 is positioned at a 90 degree corner of a framed building.

Figure 13:
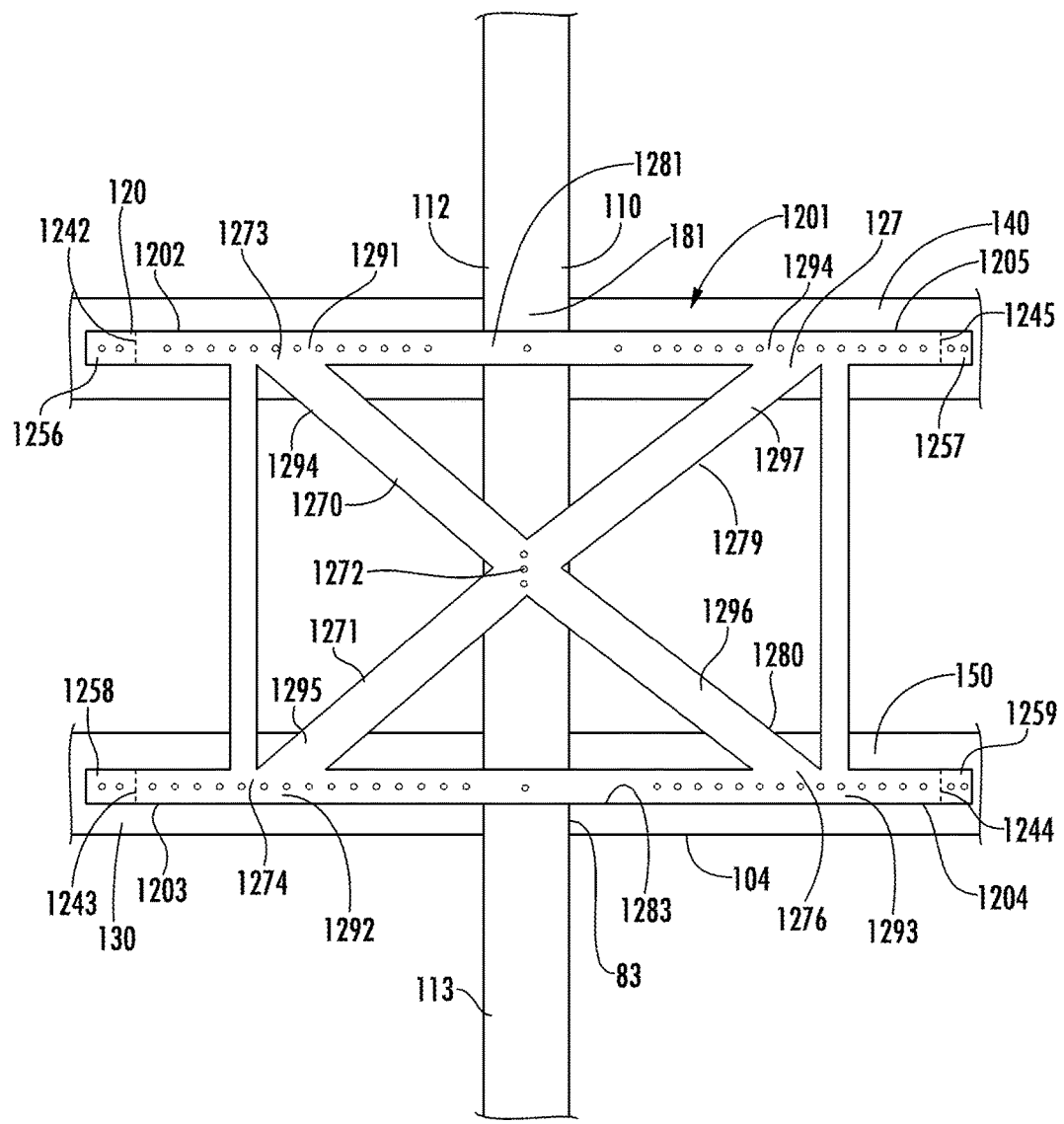
FIG. 13 illustrates a general shear transfer system where a shear tie strap of is attached to the framing of a framed building.
Figure 14:
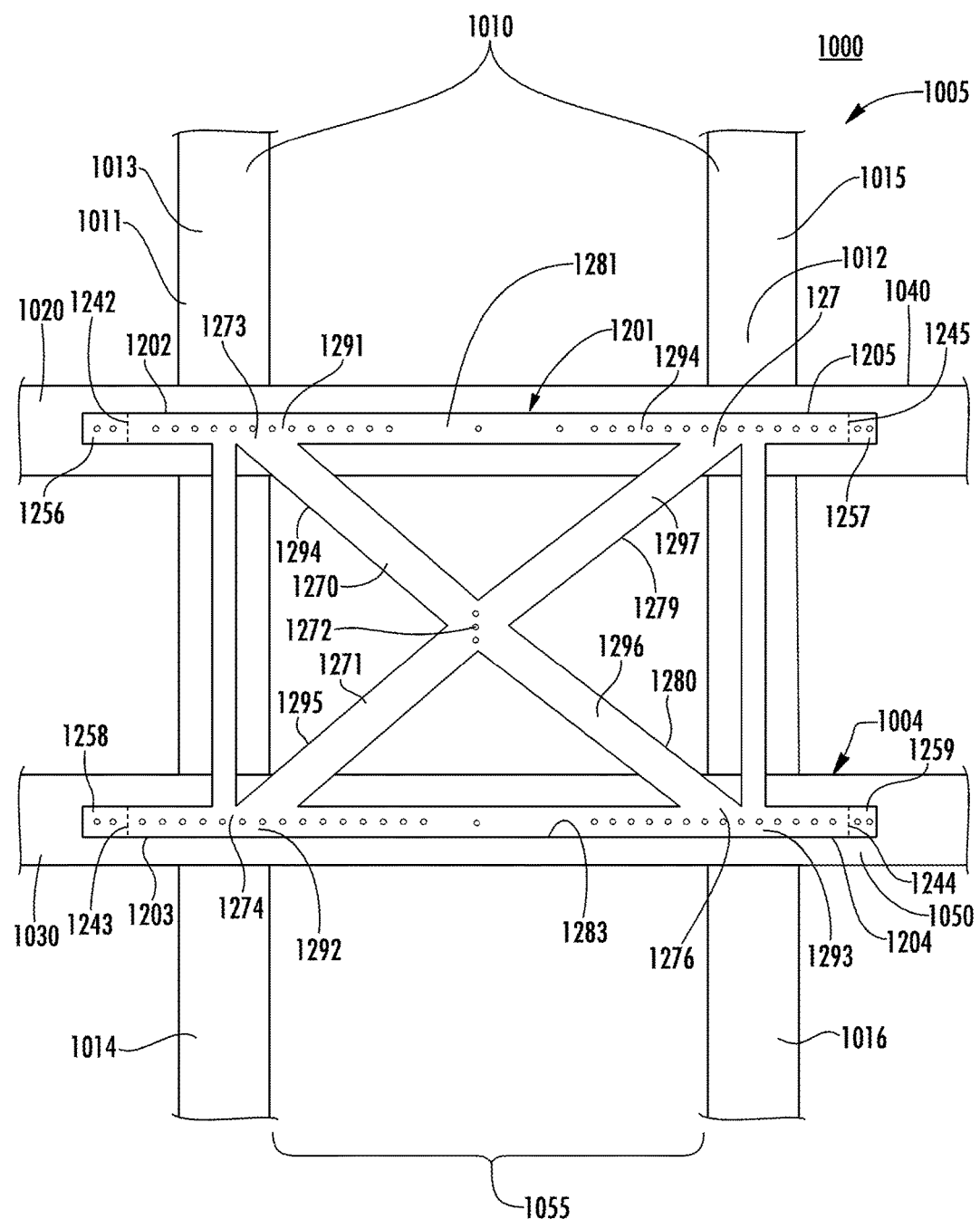
FIG. 14 illustrates a general shear transfer system where a shear tie strap is attached to the framing of a framed building.

FIGS. 13 and 14 illustrate a shear tie system comprising a shear tie strap with a extensions, as described with respect to FIG. 12. FIGS. 13 and 14 correspond to FIGS. 1 and 10, respectively, where the shear tie strap of FIGS. 1 and 10 is replaced with a shear tie strap comprising the extension. The elements indicated by reference characters in FIGS. 13 are similar to those of FIG. 1 and FIG. 12. Similarly, the reference characters in FIG. 14 are similar to those in FIGS. 10 and 12. The description of embodiments illustrated in FIGS. 13 and 14 is, thus, similar to the description related to FIGS. 1 and 10 with the replacement of the shear tie strap in FIGS. 1 and 10 with a shear tie strap comprising extensions.

Embodiments—The following list includes particular embodiments of the present invention. But the list is not limiting and does not exclude alternate embodiments, as would be appreciated by one of ordinary skill in the art.

Embodiments

1. A shear transfer system comprising:

a first framing member, a second framing member, a third framing member, a fourth framing member, a fifth framing member, and a shear tie strap;

the second framing member, the third framing member, the fourth framing member, and the fifth framing member connected to the first framing member in a building frame, and oblique or orthogonal to the first framing member;

the second framing member and the third framing member extending away from the first framing member in a first direction, the fourth framing member and the fifth framing member extending away from the first framing member in a second direction, the second framing member opposed to the fourth framing member, and the third framing member opposed to the fifth framing member;

the shear tie strap comprising two cross straps, a center where the two cross straps intersect or cross, and termini at each end of both cross straps, the center of the shear tie strap attached to the first framing member;

the shear tie strap further comprising a first longitudinal end displaced from the center of the shear tie strap in a first direction toward the first end of the first framing member, and a second longitudinal end displaced from the center of the shear tie strap in a second direction toward a second end of the first framing member and opposite to the first direction;

the termini on the first longitudinal end respectively attached to the second framing member and the fourth framing member, and the termini on the second longitudinal end respectively attached to the third framing member and the fifth framing member.

2. The shear transfer system of embodiment 1, wherein the framed building comprises a corner between adjoining walls and a corner post at the corner, and the first framing member is the corner post.

3. The shear transfer system of embodiment 2, wherein the framed building comprises bracing or blocking between studs in each adjoining wall and the corner post, and the second framing member, the third framing member, the fourth framing member, and the fifth framing member are respective portions of the bracing or blocking.

4. The shear transfer system of embodiment 1, wherein the framed building comprises a dormer comprising a dormer wall comprising dormer studs, and a roof comprising a first rafter, a second rafter, and blocking between the first rafter and the second rafter, the first rafter forming an intersection between the roof and the dormer wall and the second rafter distal to the dormer wall relative to the first rafter, the first framing member is the rafter, the second framing member and the third framing member are respective ones of the dormer studs or blocking therebetween, and the fourth framing member and the fifth framing member are respective portions of the blocking.

5. The shear transfer system of embodiment 1, wherein the framed building comprises a roof comprising a trimmer, and a dormer comprising a dormer roof comprising dormer rafters, a header, a valley framing member forming an intersection between the roof and the dormer roof, and a dormer wall supported by the trimmer; and the first framing member is the valley framing member, the second framing member and third framing member are respective dormer rafters or blocking therebetween, the fourth framing member is the header, and the fifth framing member is the trimmer.

6. The shear transfer system of embodiment 1, wherein the framed building comprises a first level wall comprising first level studs attached to a top plate, a second level wall above the first level wall and comprising second level studs attached to a bottom plate, and a joist interposed between the top plate and the bottom plate; the first framing member is the joist, the second framing member and the third framing member are respective first level studs, and the fourth framing member and the fifth framing member are respective second level studs.

7. The shear transfer system of embodiment 1, wherein the framed building comprises a wall comprising wall studs and a top plate, a gable above the wall and comprising an end plate, gable studs attached to the end plate, wherein the end plate is positioned above the top plate; the first framing member being the top plate or the end plate, the second framing member and the third framing member being respective wall studs, and the fourth framing member and fifth framing member being respective gable studs.

8. The shear transfer system of embodiment 1, wherein the framed building comprises a roof comprising an exterior rafter, an interior rafter, and blocking members between the exterior rafter and the interior rafter, and a gable framed by the exterior rafter and comprising gable studs; the first framing member being an arm of the exterior rafter, the second framing member and the third framing member being respective gable studs or blocking located therebetween, and the fourth framing member and fifth framing member being respective ones of the blocking members.

9. The shear transfer system of embodiment 1, wherein the framed building comprises a hip roof comprising a hip rafter, wherein the first framing member is the hip rafter.

10. The shear transfer system of embodiment 1, wherein the framed building comprises a hip roof comprising a valley rafter, wherein the first framing member is the valley rafter.

11. The shear transfer system of any one of embodiments 1-10, wherein the frame has an exterior side and an interior side relative to the framed building and the shear tie strap is on the exterior side.

12. The shear transfer system of embodiment 11, wherein sheathing is interposed between the shear tie strap and the first framing member, the second framing member, the third framing member, the fourth framing member, and the fifth framing member.

13. The shear transfer system of any one of embodiments 1-12, wherein the shear tie strap comprises fastener strips at one or more of the center or any one or more of the termini.

14. The shear transfer system of embodiment 13, wherein the fastener strips are nailer strips and nails are positioned through the nailer strips and into the first framing member, the second framing member, the third framing member, the fourth framing member, and the fifth framing member.

15. The shear transfer system of any one or more of embodiments 1-14, wherein the shear tie strap further comprises a first connecting strap that extends over the first framing member and connects the cross straps on the first longitudinal end of the shear tie strap; and a second connecting strap that extends over the first framing member and connects the cross straps on the second longitudinal end of the shear tie strap.

16. The shear transfer system of embodiment 15, wherein one or both of the first connecting strap or the second connecting strap are fastened to the respective termini on the first longitudinal end or the second longitudinal end and optionally comprise one or more fastener strips.

17. A shear transfer system comprising: a first framing element and a second framing element, a second framing member, a third framing member, a fourth framing member, a fifth framing member, and a shear tie strap;

the first framing element separated from the second framing element by a width and each of the first framing element and the second framing element comprising a respective length, a respective first end, and a respective second end and each of the first framing element and the second framing element integrated in a frame of a framed building;

the second framing member and the third framing member extending across the first framing element and toward the second framing element across the width, the fourth framing member and the fifth framing member extending across the second framing element and toward the first framing element across the width;

the second framing member opposing the fourth framing member in the frame, and the third framing member opposing the fifth framing member in the frame;

the shear tie strap comprising a first cross strap and a second cross strap intersecting or crossing the first cross strap, a center where the first cross strap and the second cross strap intersect or cross, termini at each end of each cross strap, a first connecting strap connecting a first one of the termini of the first cross strap to a first one of the termini of the second cross strap, a second connecting strap connecting a second one of the termini of the first cross strap to a second one of the termini of the second cross strap, a third connecting strap connecting the first one of the termini of the first cross strap to the second one of the termini of the second cross strap, and a fourth connecting strap connecting the second one of the termini of the first cross strap with the first one of the termini of the second cross strap;

the first connecting strap attached to the first framing element, the second connecting strap attached to the second framing element, the third connecting strap attached to the second framing member and the fourth framing member, and the fourth connecting strap attached to the third framing member and the fifth framing member.

18. The shear transfer system of embodiment 17, wherein the second framing member and the fourth member are top chords of a first truss in a roof of the framed building, the third framing member and the fifth framing member are top chords of a second truss next to the first truss in the roof, the first truss and the second truss comprising respective peaks, respective first sides, and respective second sides; and the first framing element is a stringer connecting the top chord on the first side of the first truss to the top chord on the first side of the second truss, and the second framing element is a stringer connecting the top chord on the second side of the first truss to the top chord on the second side of the second truss.

19. The shear transfer system of embodiment 18, wherein the roof includes sheathing above the top chords and the sheathing is interposed between the shear tie strap and the first truss and the second truss.

20. The shear transfer system of embodiment 19, wherein at least one of the first framing element or the second framing element is attached on an interior side of the respective top chord and blocking fills space between the at least one of the first framing element or the second framing element and the sheathing.

21. The shear transfer system of embodiment 17 applied to a position described in any one of embodiments 2-10.

22. The shear transfer system of any one or more of embodiments 20 or 21 with the features of any one or more of embodiments 11-14.

23. A shear tie strap comprising:

a first sheet metal body including a cross strap having a first intermediate region, and a second sheet metal body including a cross strap having a second intermediate region, the first intermediate region and the second intermediate region intersect or cross to form a center of the shear tie strap;

the first sheet metal body has a first terminus and a second terminus and further includes a fastener strip at the first terminus and a fastener strip at the second terminus, and the second sheet metal body has a first terminus and a second terminus and further includes a fastener strip at the first terminus and a fastener strip at the second terminus, a first connecting strap connecting the first terminus of the first sheet metal body and the first terminus of the second sheet metal body, a second connecting strap connecting the second terminus of the first sheet metal body and the second terminus of the second sheet metal body and parallel to the first connecting strap, a third connecting strap connecting the first terminus of the first sheet metal body and the second terminus of the second sheet metal body and perpendicular to the first connecting strap and second connecting strap, and a fourth connecting strap connecting the first terminus of the second sheet metal body and the second terminus of the first sheet metal body and perpendicular to the first connecting strap and second connecting strap, and a first extension extending away from a first end of the first connecting strap, a second extension extending away from a second end of the first connecting strap, a third extension extending away from a first end of the second connecting strap, and a fourth extension extending away from a second end of the second connecting strap.

24. The shear tie strap of embodiment 23, wherein at least one of the first connecting strap or the second connecting strap comprises a fastener strip.

25. The shear tie strap of embodiment 23 or 24, wherein at least one of the extensions comprises a fasteners strip.

26. A shear transfer system comprising:
a first framing member, a second framing member, a third framing member, a fourth framing member, a fifth framing member, and the shear tie strap of any one or more of embodiments 23 to 25;
the second framing member, the third framing member, the fourth framing member, and the fifth framing member connected to the first framing member in a building frame, and oblique or orthogonal to the first framing member;
the second framing member and the third framing member extending away from the first framing member in a first direction, the fourth framing member and the fifth framing member extending away from the first framing member in a second direction, the second framing member opposed to the fourth framing member, and the third framing member opposed to the fifth framing member;
the shear tie strap further comprising a first longitudinal end displaced from the center of the shear tie strap in a first direction toward the first end of the first framing member, and a second longitudinal end displaced from the center of the shear tie strap in a second direction toward a second end of the first framing member and opposite to the first direction;
the center of the shear tie strap attached to the first framing member; and
the termini on the first longitudinal end respectively attached to the second framing member and the fourth framing member, and the termini on the second longitudinal end respectively attached to the third framing member and the fifth framing member.

27. The shear transfer system of embodiment 26, applied to a position described in any one of embodiments 2-10.

28. The shear transfer system of any one or more of embodiments 26 and 27 with the features of any one or more of embodiments 11-14.

29. The shear transfer system of any one or more of embodiments 26-28, wherein the first extension is attached to the second framing member, the second extension is attached to the fourth framing member, the third extension is attached to the third framing member, and the fourth extension is attached to the fifth framing member.

30. The shear transfer system of any one or more of embodiments 26-29, wherein at least one of the first extension, the second extension third extension, the third extension, and the fourth extension comprise a respective outer end, score lines between the respective terminus of the cross strap and the respective outer end, and an outer region between the respective score line and respective outer end.

31. The shear transfer system of embodiment 30, wherein at least one of the first extension, the second extension third extension, the third extension, and the fourth extension is bent at the respective score line and the respective outer region is attached to a face of the respective framing member different than the face to which the respective terminus is attached.

32. The shear transfer system of any one or more of embodiments 26-29, wherein at least one of the first extension, the second extension, the third extension, and the fourth extension is attached to a framing member proximal to the second framing member, fourth framing member, third framing member, or fifth framing member, respectively.

33. A shear transfer system comprising:
a first framing element and a second framing element, a second framing member, a third framing member, a fourth framing member, a fifth framing member, and the shear tie strap of any one or more of embodiments 23 to 25;
the first framing element separated from the second framing element by a width and each of the first framing element and the second framing element comprising a respective length, a respective first end, and a respective second end and each of the first framing element and the second framing element integrated in a frame of a framed building;
the second framing member and the third framing member extending across the first framing element and toward the second framing element across the width, the fourth framing member and the fifth framing member extending across the second framing element and toward the first framing element across the width;
the second framing member opposing the fourth framing member in the frame, and the third framing member opposing the fifth framing member in the frame;
the first connecting strap attached to the first framing element, the second connecting strap attached to the second framing element, the third connecting strap attached to the second framing member and the fourth framing member, and the fourth connecting strap attached to the third framing member and the fifth framing member.

34. The shear transfer system of embodiment 33, wherein at least one of the first extension, the second extension third extension, the third extension, and the fourth extension comprise a respective outer end, score lines between the respective terminus of the cross strap and the respective outer end, and an outer region between the respective score line and respective outer end.

35. The shear transfer system of embodiment 33, wherein at least one of the first extension, the second extension third extension, the third extension, and the fourth extension is bent at the respective score line and the respective outer region is attached to a face of the respective framing member different than the face to which the respective terminus is attached.

36. The shear transfer system of embodiment 33, wherein at least one of the first extension, the second extension, the third extension, and the fourth extension is attached to a framing member proximal to the framing member to which the respective terminus is attached.

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:
1. A shear transfer system comprising:
a first framing member of a building frame, a second framing member, a third framing member, a fourth framing member, a fifth framing member, and a shear tie strap;
the first framing member comprising a first end and a second end;
the second framing member, the third framing member, the fourth framing member, and the fifth framing member connected to the first framing member in the building frame, and oblique or orthogonal to the first framing member;

the second framing member and the third framing member extending away from the first framing member in a first direction, the fourth framing member and the fifth framing member extending away from the first framing member in a second direction, the second framing member opposed to the fourth framing member, and the third framing member opposed to the fifth framing member;

the shear tie strap comprising a first sheet metal body comprising a first cross strap having a first intermediate region, and a second sheet metal body comprising a second cross strap having a second intermediate region, the first intermediate region and the second intermediate region intersect or cross to form a center of the shear tie strap, the first cross strap has a first terminus and a second terminus and further comprises a fastener strip at the first terminus and a fastener strip at the second terminus, and the second cross strap has a first terminus and a second terminus and further comprises a fastener strip at the first terminus and a fastener strip at the second terminus; a first connecting strap connecting the first terminus of the first cross strap and the first terminus of the second cross strap, a second connecting strap connecting the second terminus of the first cross strap and the second terminus of the second cross strap and parallel to the first connecting strap, a third connecting strap connecting the first terminus of the first cross strap and the second terminus of the second cross strap and perpendicular to the first connecting strap and second connecting strap, and a fourth connecting strap connecting the first terminus of the second cross strap and the second terminus of the first cross strap and perpendicular to the first connecting strap and second connecting strap, and a first extension extending from the first terminus of the first cross strap, a second extension extending from the first terminus of the second cross strap, a third extension extending from the second terminus of the second cross strap, and a fourth extension extending from second terminus of the first cross strap;

the shear tie strap further comprising a first longitudinal end, comprising the first termini of the first and second cross straps, displaced from the center of the shear tie strap in a first direction toward the first end of the first framing member, and a second longitudinal end, comprising the second termini of the first and second cross straps, displaced from the center of the shear tie strap in a second direction toward a second end of the first framing member and opposite to the first direction;

the center of the shear tie strap attached to the first framing member; and the first terminus of the first cross strap and the first terminus of the second cross strap on the first longitudinal end respectively attached to the second framing member and the fourth framing member, and the second terminus of the second cross strap and the second terminus of the first cross strap on the second longitudinal end respectively attached to the third framing member and the fifth framing member.

2. The shear transfer system of claim 1, wherein the framed building comprises a corner between adjoining walls and a corner post at the corner, and the first framing member is the corner post.

3. The shear transfer system of claim 1, wherein the framed building comprises a dormer comprising a dormer wall comprising dormer studs, and a roof comprising a first rafter, a second rafter, and blocking between the first rafter and the second rafter, the first rafter forming an intersection between the roof and the dormer wall and the second rafter distal to the dormer wall relative to the first rafter, the first framing member is the first rafter, the second framing member and the third framing member are respective ones of the dormer studs or blocking therebetween, and the fourth framing member and the fifth framing member are respective portions of the blocking.

4. The shear transfer system of claim 1, wherein the framed building comprises a roof comprising a trimmer, and a dormer comprising a dormer roof comprising dormer rafters, a header, a valley framing member forming an intersection between the roof and the dormer roof, and a dormer wall supported by the trimmer; and the first framing member is the valley framing member, the second framing member and third framing member are respective dormer rafters or blocking therebetween, the fourth framing member is the header, and the fifth framing member is the trimmer.

5. The shear transfer system of claim 1, wherein the framed building comprises a first level wall comprising first level studs attached to a top plate, a second level wall above the first level wall and comprising second level studs attached to a bottom plate, and a joist interposed between the top plate and the bottom plate; the first framing member is the joist, the second framing member and the third framing member are respective first level studs, and the fourth framing member and the fifth framing member are respective second level studs.

6. The shear transfer system of claim 1, wherein the framed building comprises a wall comprising wall studs and a top plate, a gable above the wall and comprising an end plate, gable studs attached to the end plate, wherein the end plate is positioned above the top plate; the first framing member being the top plate or the end plate, the second framing member and the third framing member being respective wall studs, and the fourth framing member and fifth framing member being respective gable studs.

7. The shear transfer system of claim 1, wherein the framed building comprises a roof comprising an exterior rafter, an interior rafter, and blocking members between the exterior rafter and the interior rafter, and a gable framed by the exterior rafter and comprising gable studs; the first framing member being an arm of the exterior rafter, the second framing member and the third framing member being respective gable studs or blocking located therebetween, and the fourth framing member and fifth framing member being respective ones of the blocking members.

8. The shear transfer system of claim 1, wherein the framed building comprises a hip roof comprising a hip rafter, wherein the first framing member is the hip rafter.

9. The shear transfer system of claim 1, wherein the framed building comprises a hip roof comprising a valley rafter, wherein the first framing member is the valley rafter.

10. The shear transfer system of claim 1, wherein the frame has an exterior side and an interior side relative to the framed building and the shear tie strap is on the exterior side.

11. The shear transfer system of claim 10, wherein sheathing is interposed between the shear tie strap and the first framing member, the second framing member, the third framing member, the fourth framing member, and the fifth framing member.

12. The shear transfer system of claim 1, wherein the first extension is attached to the second framing member, the second extension is attached to the fourth framing member, the third extension is attached to the third framing member, and the fourth extension is attached to the fifth framing member.

13. The shear transfer system of claim 1, wherein at least one of the first extension, the second extension, the third extension, and the fourth extension comprise a respective outer end, a respective score line between the respective terminus from which the extension extends and the respective outer end, and an outer region between the respective score line and respective outer end, and at least one of the first extension, the second extension, the third extension, and the fourth extension is bent at the respective score line and the respective outer region is attached to a face of the respective framing member different than the face to which the respective terminus is attached.

14. The shear transfer system of claim 1, wherein at least one of the first extension, the second extension, the third extension, and the fourth extension is attached to a framing member proximal to the framing member to which the respective terminus is attached.

15. A shear transfer system comprising:

a first framing element and a second framing element, a second framing member, a third framing member, a fourth framing member, a fifth framing member, and a shear tie strap;

the first framing element separated from the second framing element by a width and each of the first framing element and the second framing element comprising a respective length, a respective first end, and a respective second end and each of the first framing element and the second framing element integrated in a frame of a framed building;

the second framing member and the third framing member extending across the first framing element and toward the second framing element across the width, the fourth framing member and the fifth framing member extending across the second framing element and toward the first framing element across the width;

the second framing member opposing the fourth framing member in the frame, and the third framing member opposing the fifth framing member in the frame;

the shear tie strap comprising a first sheet metal body comprising a first cross strap having a first intermediate region, and a second sheet metal body comprising a second cross strap having a second intermediate region, the first intermediate region and the second intermediate region intersect or cross to form a center of the shear tie strap, the first cross strap has a first terminus and a second terminus and further comprises a fastener strip at the first terminus and a fastener strip at the second terminus, and the second cross strap has a first terminus and a second terminus and further comprises a fastener strip at the first terminus and a fastener strip at the second terminus; a first connecting strap connecting the first terminus of the first cross strap and the first terminus of the second cross strap, a second connecting strap connecting the second terminus of the first cross strap and the second terminus of the second cross strap and parallel to the first connecting strap, a third connecting strap connecting the first terminus of the first cross strap and the second terminus of the second cross strap and perpendicular to the first connecting strap and second connecting strap, and a fourth connecting strap connecting the first terminus of the second cross strap and the second terminus of the first cross strap and perpendicular to the first connecting strap and second connecting strap, and a first extension extending from the first terminus of the first cross strap, a second extension extending from the first terminus of the second cross strap, a third extension extending from the second terminus of the second cross strap, and a fourth extension extending from second terminus of the first cross strap;

the third connecting strap attached to the first framing element, the fourth connecting strap attached to the second framing element, the first connecting strap attached to the second framing member and the fourth framing member, and the second connecting strap attached to the third framing member and the fifth framing member.

16. The shear transfer system of claim 15, wherein at least one of the first extension, the second extension, the third extension, and the fourth extension comprise a respective outer end, a respective score line between the respective terminus from which the extension extends and the respective outer end, and an outer region between the respective score line and respective outer end; and at least one of the first extension, the second extension, the third extension, and the fourth extension is bent at the respective score line and the respective outer region is attached to a face of the respective framing member different than the face to which the respective terminus is attached.

17. The shear transfer system of claim 15, wherein at least one of the first extension, the second extension, the third extension, and the fourth extension is attached to a framing member proximal to the framing member to which the respective terminus is attached.

18. The shear transfer system of claim 1, wherein at least one of the first connecting strap or the second connecting strap comprises a fastener strip.

19. The shear transfer system of claim 1, wherein at least one of the extensions comprises a fasteners strip.

20. The shear transfer system of claim 15, wherein at least one of the first connecting strap or the second connecting strap comprises a fastener strip.

21. The shear transfer system of claim 15, wherein at least one of the extensions comprises a fasteners strip.

* * * * *